(12) United States Patent
Valentino et al.

(10) Patent No.: US 11,458,050 B2
(45) Date of Patent: Oct. 4, 2022

(54) COT FASTENING SYSTEM HAVING A CRASH STABLE, COT FASTENER TRACK AND METHOD OF AFFIXING AN EMERGENCY COT THERETO

(71) Applicant: Ferno-Washington, Inc., Wilmington, OH (US)

(72) Inventors: Nicholas V. Valentino, Springboro, OH (US); Timothy R. Wells, Hillsboro, OH (US); Christopher Way, Mason, OH (US); Alan Raymond Cambridge, Wooloowin (AU); Gavin Lee Broadley, Marcoola (AU)

(73) Assignee: FERNO-WASHINGTON, INC., Wilmington, OH (US)

(*) Notice: Subject to any disclaimer, the term of this patent is extended or adjusted under 35 U.S.C. 154(b) by 136 days.

(21) Appl. No.: 16/746,085

(22) Filed: Jan. 17, 2020

(65) Prior Publication Data

US 2020/0146905 A1    May 14, 2020

Related U.S. Application Data

(62) Division of application No. 15/504,154, filed as application No. PCT/US2015/045832 on Aug. 19, 2015, now Pat. No. 10,568,787.
(Continued)

(51) Int. Cl.
*B60P 7/08*    (2006.01)
*A61G 3/08*    (2006.01)
(Continued)

(52) U.S. Cl.
CPC ......... *A61G 3/0825* (2013.01); *A61G 3/0209* (2013.01); *A61G 3/0263* (2013.01);
(Continued)

(58) Field of Classification Search
CPC .. B60P 7/0807; B60P 7/16; B60P 3/00; B60P 3/06; A61G 3/0825; A61G 3/0209;
(Continued)

(56) References Cited

U.S. PATENT DOCUMENTS 1,609,253 A    11/1926    Hummert et al.
1,858,530 A    5/1932    Deest
(Continued)

FOREIGN PATENT DOCUMENTS

CN    2524726    12/2002
DE    102008005900 A1    7/2009
(Continued)

OTHER PUBLICATIONS

Australian Examination Report No. 1 pertaining to corresponding patent application No. 20153055583, dated Mar. 13, 2019.
(Continued)

*Primary Examiner* — Stephen T Gordon
(74) *Attorney, Agent, or Firm* — Dinsmore & Shohl LLP

(57) ABSTRACT

Cot fastening systems which fix and hold an emergency cot to a crash stable, cot fastener track included in the system and provided within an emergency vehicle and methods of affixing the emergency cot thereto are disclosed. The track has a longitudinal length with first and second ends, open side rails longitudinally extending between the ends, and a channel centrally located between the rails. The side rails align, accommodate and guide a first fixture of the cot towards the first end as the cot is rolled within the vehicle and to retain the first fixture adjacent the first end at least vertically and laterally therein. The channel accommodates therein and retains a second fixture adjacent the second end at least vertically and laterally therein. A securing mecha-
(Continued)

nism releasably prevents removal of the first fixture from the open side rails and removal of the second fixture from the channel.

15 Claims, 41 Drawing Sheets

Related U.S. Application Data

(60) Provisional application No. 62/115,847, filed on Feb. 13, 2015, provisional application No. 62/039,005, filed on Aug. 19, 2014.

(51) Int. Cl.
  *B60P 7/16* (2006.01)
  *A61G 3/02* (2006.01)
  *B60P 3/00* (2006.01)
  *B60P 3/06* (2006.01)

(52) U.S. Cl.
  CPC ............ *A61G 3/0272* (2013.01); *A61G 3/08* (2013.01); *A61G 3/0808* (2013.01); *A61G 3/0816* (2013.01); *A61G 3/0833* (2013.01); *A61G 3/0875* (2013.01); *A61G 3/0883* (2013.01); *A61G 3/0891* (2013.01); *B60P 3/00* (2013.01); *B60P 3/06* (2013.01); *B60P 7/16* (2013.01)

(58) Field of Classification Search
  CPC ...... A61G 3/0263; A61G 3/0272; A61G 3/08; A61G 3/0808; A61G 3/0816; A61G 3/0833; A61G 3/0875; A61G 3/0883; A61G 3/0891; A61G 3/0254
  USPC ...... 410/7, 8, 66, 67, 69, 77, 80; 296/19, 20
  See application file for complete search history.

(56) References Cited

U.S. PATENT DOCUMENTS

| | | |
|---|---|---|
| 2,558,056 A | 6/1951 | Mitchell et al. |
| 3,918,554 A | 11/1975 | Bourgraf et al. |
| 5,092,722 A | 3/1992 | Reazer, III et al. |
| 5,205,601 A * | 4/1993 | Ferris ............... A61G 3/0816 410/7 |
| 5,913,559 A | 6/1999 | Sexton et al. |
| 6,796,757 B1 | 9/2004 | Way et al. |
| 6,890,137 B2 * | 5/2005 | Hillberry ............ B60P 3/077 410/66 |
| 7,287,794 B2 | 10/2007 | Bourgraf, Jr. et al. |
| 7,478,855 B2 | 1/2009 | Lambarth et al. |
| 7,549,690 B2 | 6/2009 | Bourgraf et al. |
| 7,887,113 B2 | 2/2011 | Lambarth |
| 8,308,212 B2 | 11/2012 | Schrand |
| 8,439,416 B2 | 5/2013 | Lambarth et al. |
| 8,444,195 B2 | 5/2013 | Bourgraf et al. |
| 8,534,732 B2 | 9/2013 | Bourgraf et al. |
| 9,022,706 B2 | 5/2015 | Misikir et al. |
| 9,608,455 B2 | 3/2017 | Byrne |
| 10,568,787 B2 * | 2/2020 | Valentino ............... B60P 3/06 |
| 2012/0235830 A1 | 9/2012 | Becker |
| 2017/0035628 A1* | 2/2017 | Naber ..................... A61G 1/04 |

FOREIGN PATENT DOCUMENTS

| | | |
|---|---|---|
| EP | 1378220 B1 | 10/2008 |
| JP | 63038515 | 3/1988 |

OTHER PUBLICATIONS

International Search Report and Written Opinion pertaining to Application No. PCT/US2015/045832, dated Nov. 18, 2015.
Japanese Office Action pertaining to Japanese Patent Application No. 2017-509703, dated Apr. 17, 2019.
Extended European Search Report pertaining to application No. 21189236.9, dated Dec. 7, 2021.

* cited by examiner

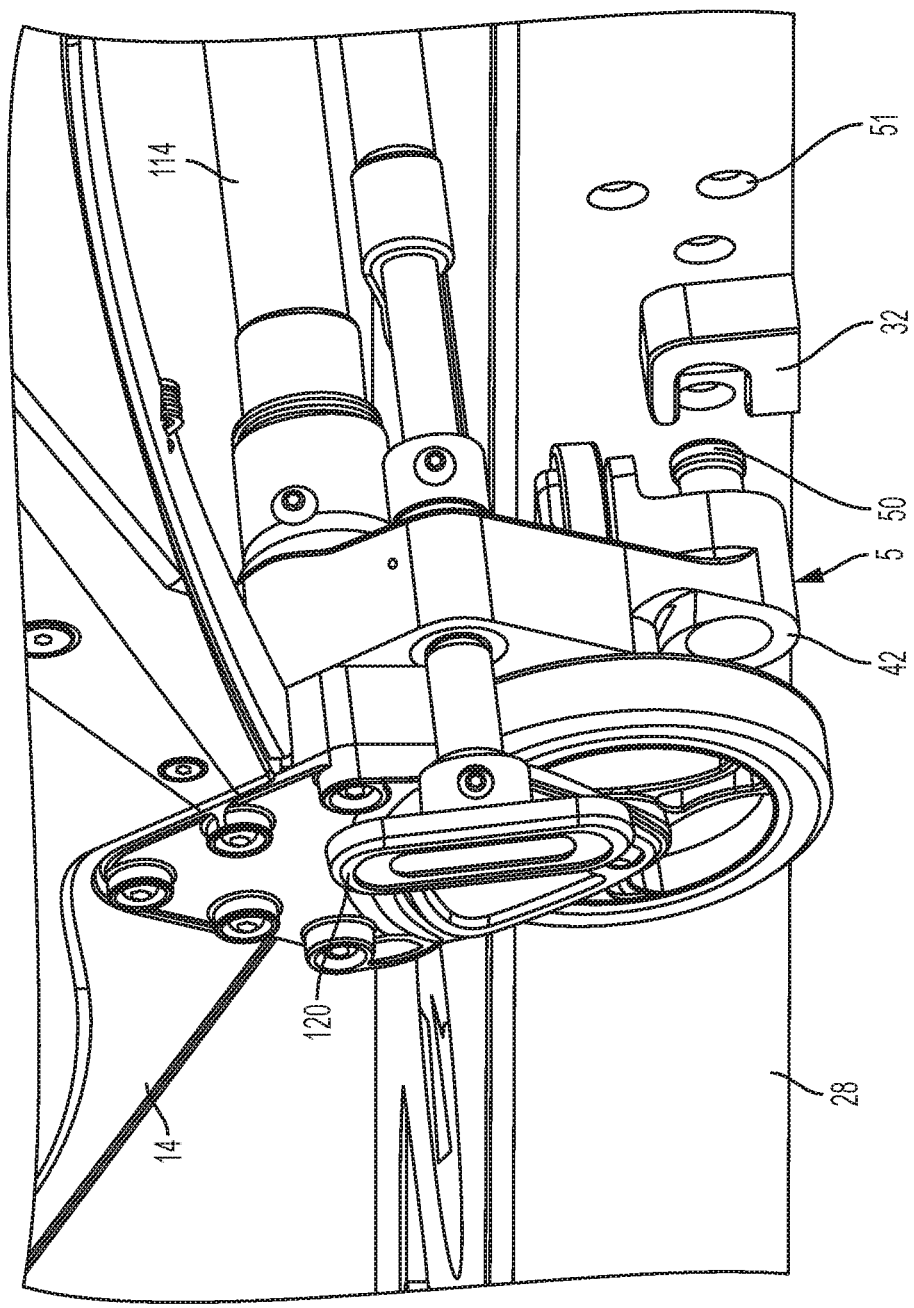

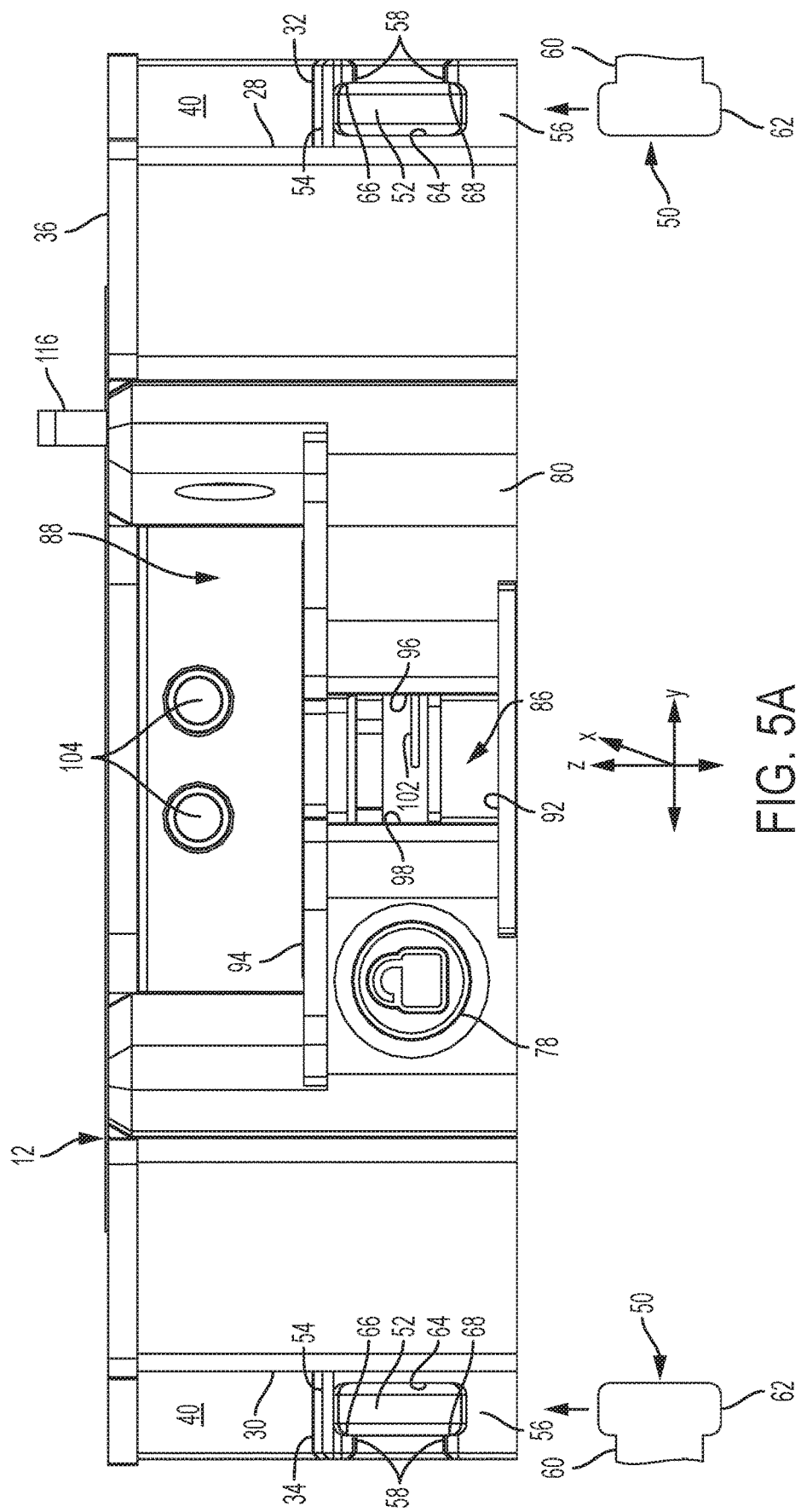

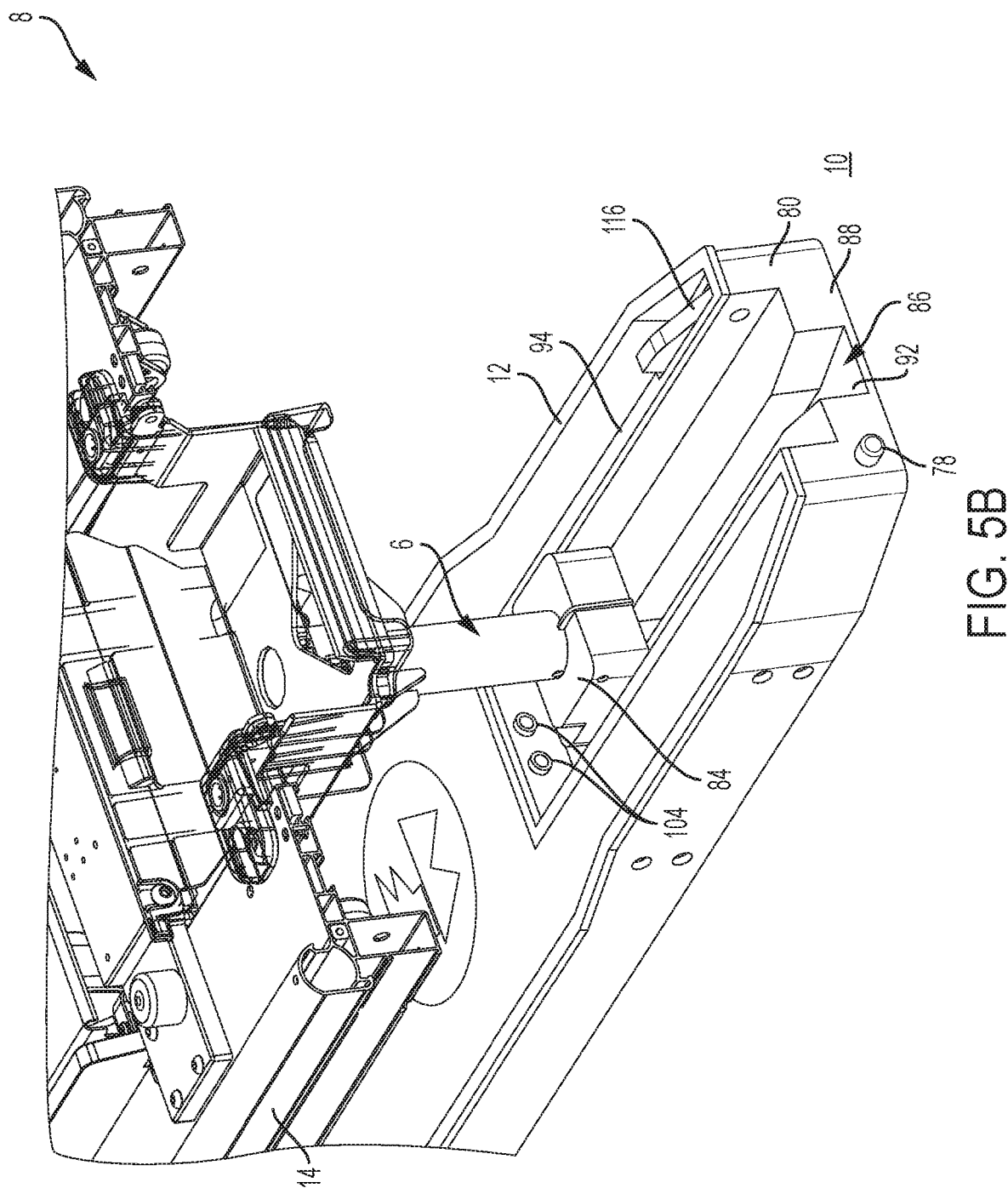

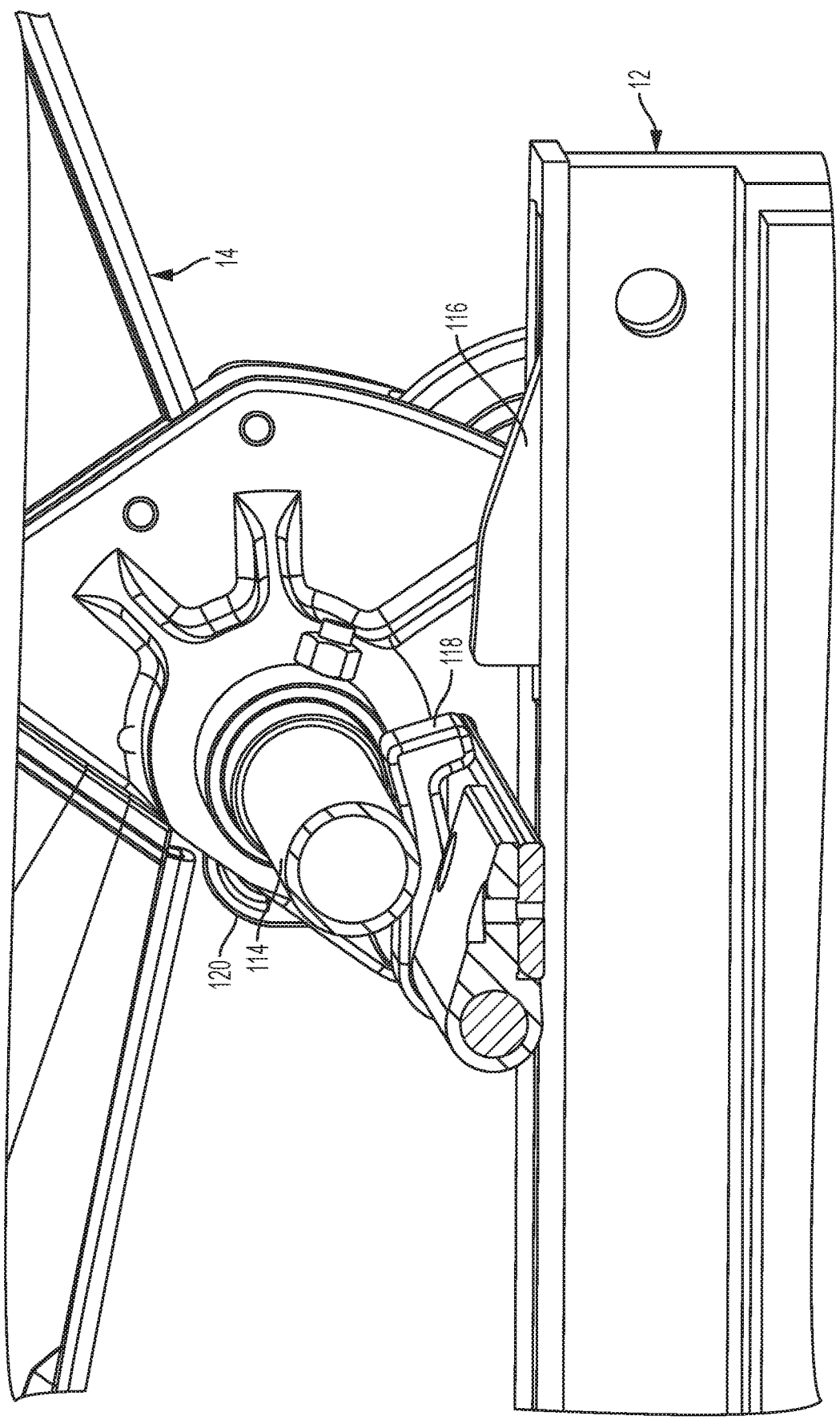

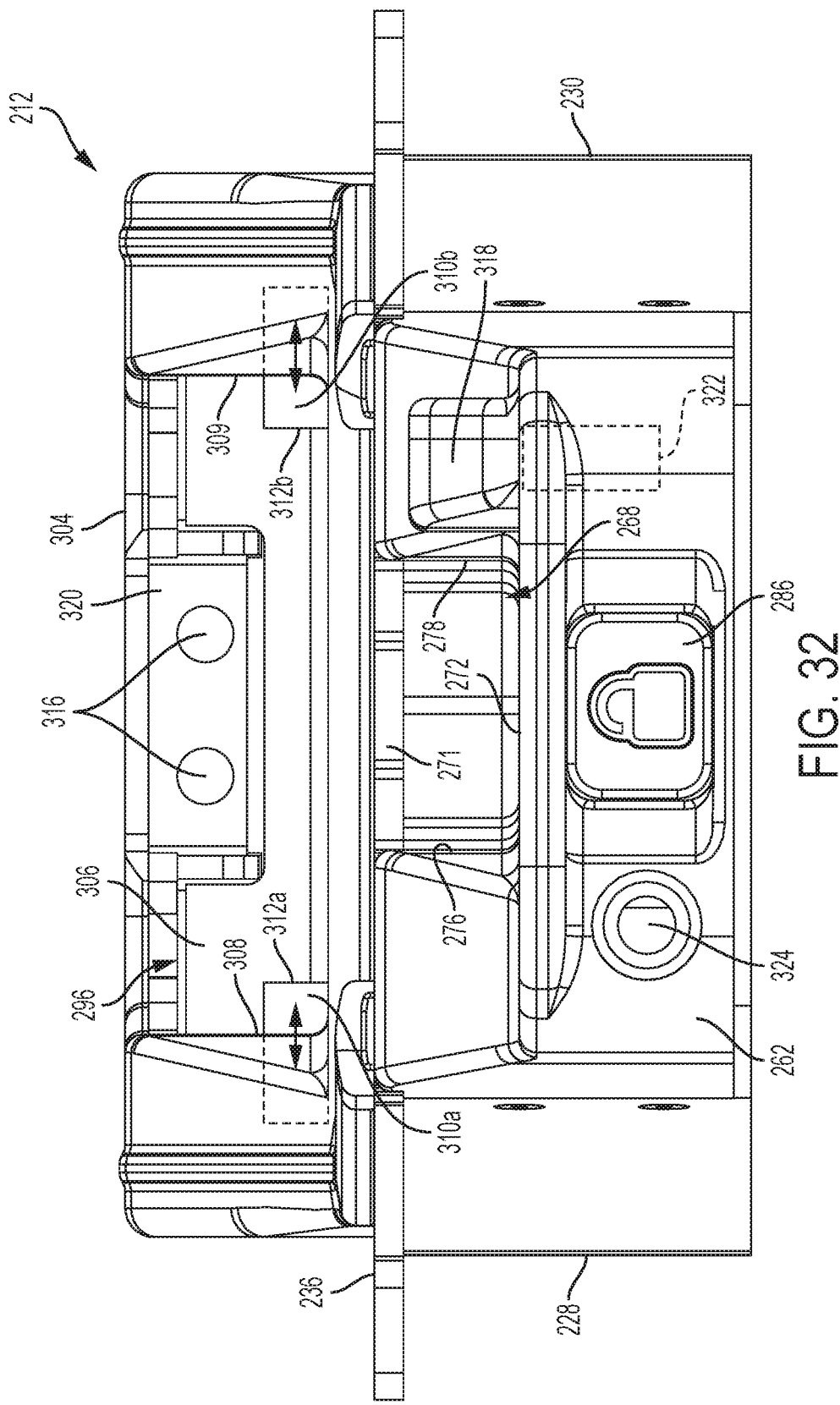

COT FASTENING SYSTEM HAVING A CRASH STABLE, COT FASTENER TRACK AND METHOD OF AFFIXING AN EMERGENCY COT THERETO

CROSS-REFERENCE TO RELATED APPLICATIONS

This application is a divisional of U.S. application Ser. No. 15/504,154, filed Feb. 15, 2017, which is a national stage application, filed under 35 U.S.C. § 371, of PCT/US2015/045832, filed Aug. 19, 2015, which claims the benefit of U.S. Provisional applications 62/039,005, filed 19 Aug. 2014, and 62/115,847, filed 13 Feb. 2015, the content of which are herein incorporated fully by reference.

TECHNICAL FIELD

The present disclosure relates cot fastening systems which fix and hold an emergency cot to a crash stable, cot fastener track included in the system and provided within an emergency vehicle, such as an ambulance or sprinter van, and methods of affixing an emergency cot thereto.

BACKGROUND

Changes in regulations may require that all emergency cots/cot mounts provided in an emergency vehicle be certified to new dynamic test standards, which to a greater extent helps ensure that all patient litters, litter retention systems, and patient restraints meet the same performance criteria as is applied to a civilian vehicle's seating and occupant restraint system when exposed to a frontal or side impact.

SUMMARY

It is against the above background that various embodiments of a cot fastening system which fixes and holds an emergency cot to a crash stable, cot fastener track including in the system and provided within an emergency vehicle, such as an ambulance or sprinter van, and methods thereof are disclosed herein.

In one embodiment, a cot fastening system which fixes and holds an emergency cot within an emergency vehicle, comprises a crash stable, fastener track as depicted and described herein.

In another embodiment, a method of holding an emergency cot within an emergency vehicle comprises providing to the cot forward, middle and rearward cot fixtures as depicted and described herein, and engaging the forward, middle and rearward cot fixtures in a crash stable, fastener track as depicted and described herein that has been provided in the emergency vehicle.

In another embodiment, a cot fastening system which fixes and holds within a transport vehicle an emergency cot having wheels, a first fixture and a second fixture is disclosed. In this embodiment, the cot fastening system comprises a cot fastener track having a longitudinal length with opposite first and second ends, a pair of open side rails longitudinally extending between the first and second ends, and a channel centrally located between the open side rails. The open side rails are configured to align therewith, accommodate therein and guide together the first fixture of the cot along the longitudinal length of the cot fastener track towards the first end as the cot is rolled by the wheels within the vehicle and to retain the first fixture adjacent the first end at least vertically and laterally therein. The channel is configured to accommodate therein and retain the second fixture adjacent the second end at least vertically and laterally therein. A securing mechanism is operably selectable between secure and unsecure conditions, in which the secure condition prevents both removal of the first fixture from the open side rails and removal of the second fixtures from the channel.

In some of the disclosed embodiments, the cot fastener track has opposite longitudinal sides and a roof plate, wherein the open side rails are defined by the roof plate having a portion which overhangs the opposite longitudinal sides.

In some of the disclosed embodiments, the cot fastener track has opposite longitudinal sides, wherein the open side rails are c-shaped rails that are provided to the longitudinal sides.

In some of the disclosed embodiments, the first end of the cot fastener track has a first width and the second end has a second width that is smaller than the first width.

In some of the disclosed embodiments, the cot fastener track has a roof plate, wherein the roof plate adjacent the first end has a first width and the roof plate adjacent the second end has a second width that is smaller than the first width, and the roof plate tapers from the first width to the second width.

In some of the disclosed embodiments, the cot fastener track has a roof plate, wherein the roof plate adjacent the first end has a first width and the roof plate adjacent the second end has a second width that is smaller than the first width, wherein the roof plate tapers from the first width to the second width, and wherein the roof plate over a majority of the longitudinal length of the cot fastener track has the first width.

In some of the disclosed embodiments, at least one of the open side rails and the channel is configured to prevent movement of the front fixture beyond the front end of the cot fastener track.

In some of the disclosed embodiments, the securing mechanism is operable to be placed in the unsecured condition via a wireless remote control.

In some of the disclosed embodiments, the channel is a first channel centrally located between the open side rails, and the cot fastener track comprises a second channel centrally located between the open side rails and configured to accommodate therein and retain a third fixture of the cot at least vertically and laterally therein, the second channel being located closer than the first channel to the first end.

In some of the disclosed embodiments, the securing mechanism is located in at least one of the first and second channels.

In some of the disclosed embodiments, the securing mechanism is located in at least one of the open side rails.

In some of the disclosed embodiments, the securing mechanism is located in the second channel.

In some of the disclosed embodiments, the cot fastener track is configured to provide power to the cot when secured thereto.

In some of the disclosed embodiments, the cot fastener track is configured to provide data communications to the cot when secured thereto.

In still another embodiment, a method of fixing and holding within a transport vehicle an emergency cot having wheels, a first fixture and a second fixture, the method comprises rolling the cot by the wheel within the transport vehicle having a cot fastener track according to any one of herein disclosed embodiments, wherein the first fixture is aligned therewith, accommodated therein and guided by the open side rails along the longitudinal length of the cot fastener track towards the first end and then retained adjacent the first end at least vertically and laterally therein, wherein the second fixture is accommodated and retained adjacent the second end at least vertically and laterally therein by the channel, and wherein the securing mechanism automatically in the secure condition prevents both removal of the first fixture from the open side rails and removal of the second fixtures from the channel.

These and other features and advantages of these and other various embodiments according to the present invention will become more apparent in view of the drawings, detailed description, and claims provided that follow hereafter.

BRIEF DESCRIPTION OF THE DRAWINGS

The following detailed description of the embodiments of the present invention can be best understood when read in conjunction with the following drawings, where like structure is indicated with like reference numerals, and in which:

FIG. 2B is a front perspective, partially broken away, of a cot transport/emergency vehicle provided with the cot fastening system of FIG. 1, and showing a close-up of a middle fixture of the cot fixture assembly that is provided to an emergency cot, which is shown with parts removed for easy of illustration and discussion, and which engages the cot fastener track at a middle portion, which is shown partially broken away, according to an embodiment of the invention;

FIG. 5A is a back view of the cot fastener track of FIG. 3;

FIG. 5B is a rear perspective, partially broken away, of a cot transport/emergency vehicle provided with the cot fastening system of FIG. 1, and showing a close-up of a rearward fixture of the cot fixture assembly that is provided to an emergency cot, which is shown with partially broken away and with parts removed for easy of illustration and discussion, and which engages the cot fastener track in inner and outer channels adjacent a back end, which is shown partially broken away, according to an embodiment of the invention;

FIGS. 12A-12D depict an unloading sequence of an emergency cot from an embodiment of a cot fastener track;

FIG. 32 depicts a rear view of the fastener according to the embodiment of the cot fastening system of FIG. 21;

DETAILED DESCRIPTION

Figure 1A:
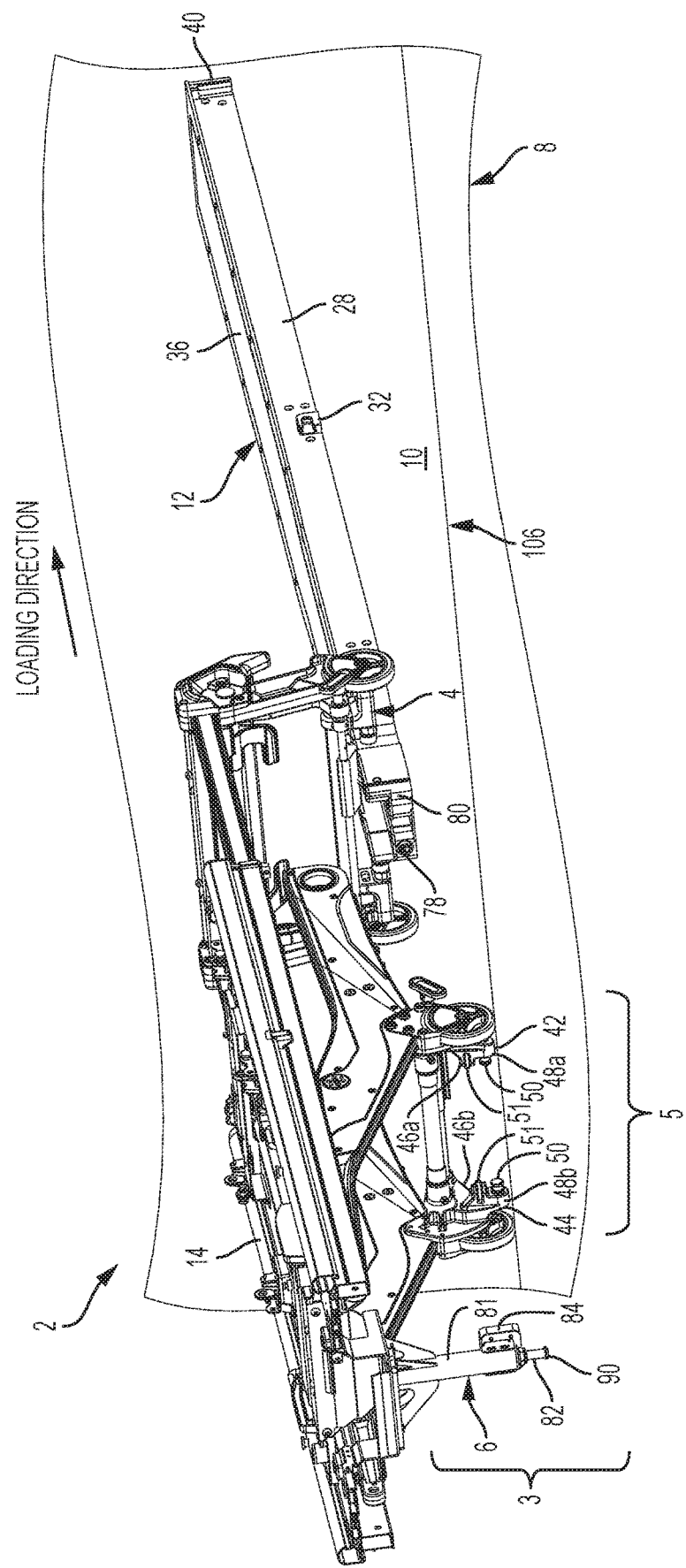
FIG. 1A depicts is a rear and side perspective of a cot transport/emergency vehicle, partially broken away, provided with a cot fastening system according to an embodiment of the invention which comprises a cot fastener track which is used to releasably secure an emergency cot, shown with parts removed for easy of illustration and discussion, via a cot fixture assembly provided to the cot and which is securable with system.

Referring to the drawings, like numbers indicate like parts throughout the views. Skilled artisans appreciate that elements in the figures are illustrated for simplicity and clarity and have not necessarily been drawn to scale. For example, the dimensions of some of the elements in the figures may be exaggerated relative to other elements, as well as parts removed to help to improve understanding of the various embodiments of the present invention.

Figure 1B:
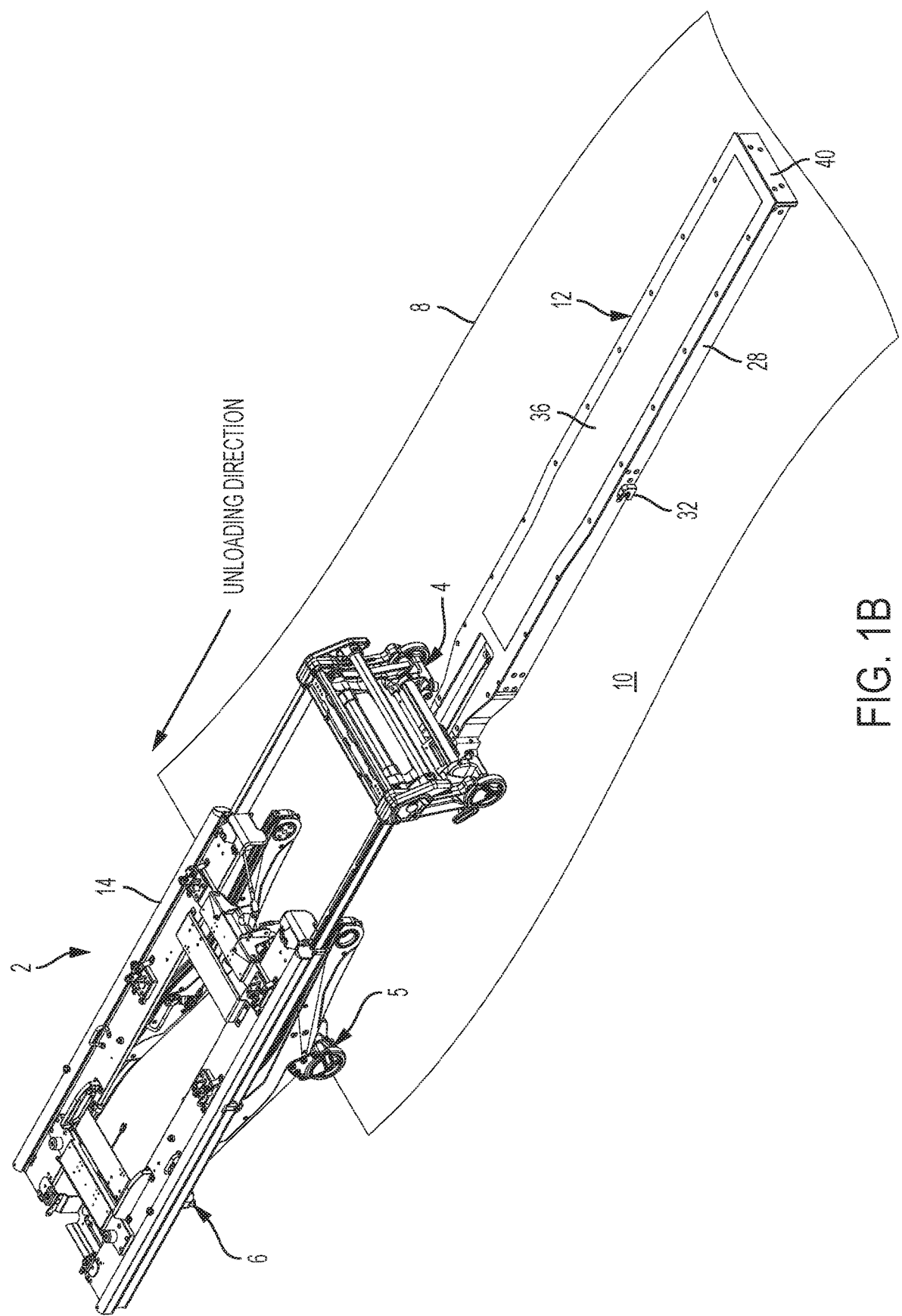
FIG. 1B depicts is a front and top perspective of a cot transport/emergency vehicle, partially broken away, provided with the cot fastening system of FIG. 1.
Figure 2A:
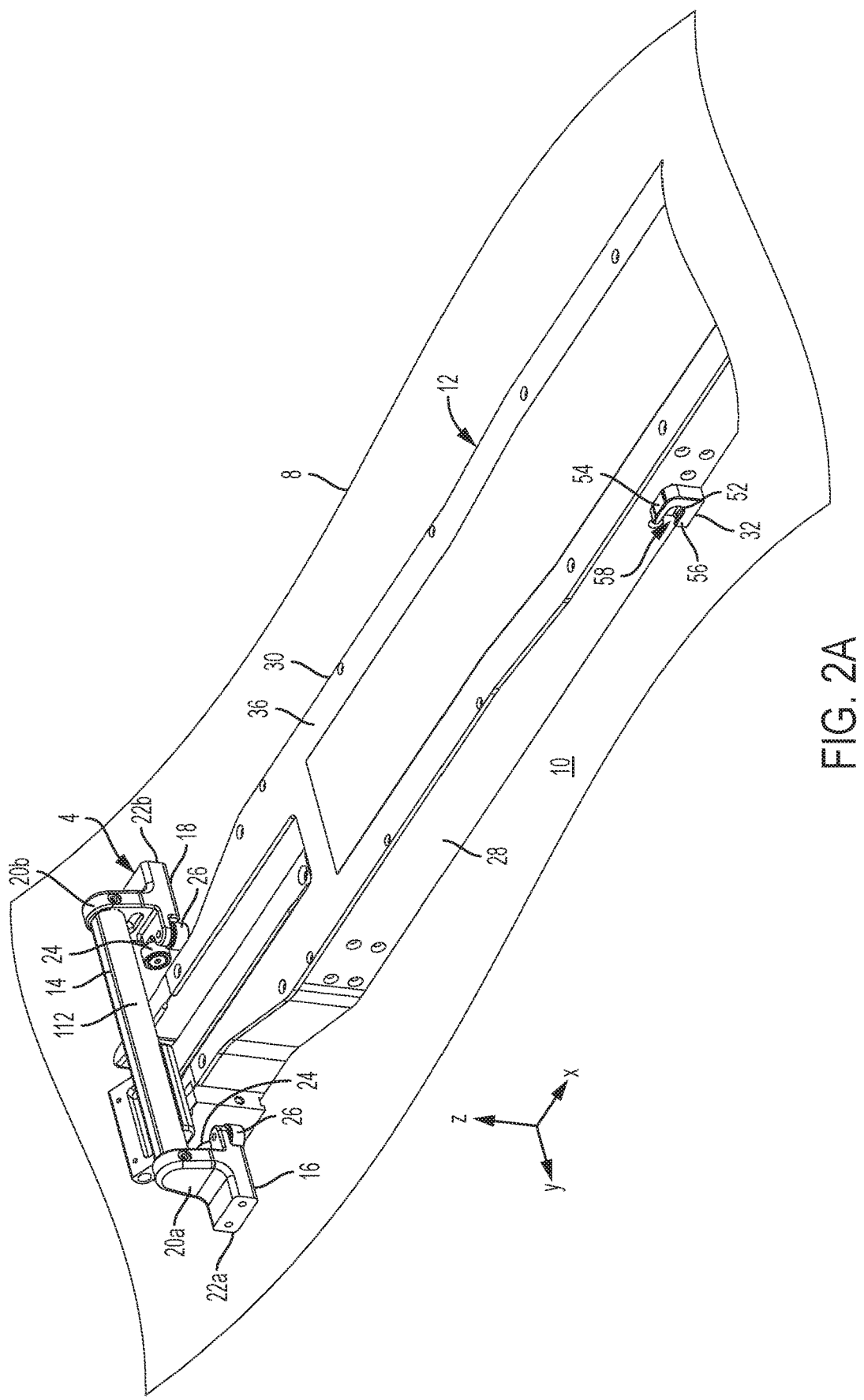
FIG. 2A is a front perspective, partially broken away, of a cot transport/emergency vehicle provided with the cot fastening system of FIG. 1, and showing a close-up of a forward fixture of the cot fixture assembly that is provided to an emergency cot, which is shown with parts removed for easy of illustration and discussion, and which engages the cot fastener track, which is shown partially broken away, according to an embodiment of the invention.

Referring to FIGS. 1A, 1B and 2A, a cot fastening system 2 is disclosed herein. The system 2 comprises an emergency cot fixture assembly that is generally shown as reference symbol 3, and which can have a forward fixture 4, a middle fixture 5, and/or a rearward fixture 6. The cot fixture assembly 3 can engage releasably within a cot transport vehicle 8, and in particular to a support surface 10 thereof, by a crash stable, cot fastener track 12, which also forms part of the system 2. The cot transport vehicle 8 typically comprises an ambulance or any other emergency rescue vehicle, such as a sprinter-type van, an airplane, a helicopter, a ship or any support structure subject to motion.

The cot fastener track 12 according to some embodiments is fitted to an ambulance and secures an emergency cot during transit. The cot fastener track 12 is able to withstand the large forces generated if the ambulance was involved in a traffic accident. The cot fastener track 12 as well as the fastening system 2 has features that assist the operator during loading and unloading. For example, the front of the emergency cot 14 can be fitted with rollers or wheels that align the cot 14 into the cot fastener track 12 as it is loaded. An additional set of rollers or wheels on the cot 14 are secured vertically to prevent the cot from tipping towards the patient's foot end of the cot as the cot is loaded or unloaded.

As illustrated by FIG. 1A, the forward fixture 4 is the first fixture of the system 2 that is engaged in the cot fastener track 12, the middle fixture 5 is the second fixture of the system 2 that is engaged in the cot fastener track 12, and the rearward fixture 6 is the third (and last) fixture of the system 2 that is engaged in the cot fastener track 12 when loading the emergency cot 14 into the vehicle 8 in a loading direction indicated by the arrow. Likewise, as illustrated by FIG. 1B, the rearward fixture 6 is the first fixture of the system 2 that is disengaged from the cot fastener track 12, the middle fixture 5 is the second fixture of the system 2 that is disengaged from the cot fastener track 12, and the forward fixture 4 is the third (and last) fixture of the system 2 that is disengaged from the cot fastener track 12 when unloading the emergency cot 14 from the vehicle 8 in the unloading direction indicated by the arrow.

As shown by FIG. 2A, a front perspective, partially broken away, of the cot transport vehicle 8 provided with the cot fastening system of FIGS. 1A and 1B, and showing a close-up of the forward fixture 4 that is provided to the emergency cot 14, which is shown with parts removed for easy of illustration and discussion, and which engages the cot fastener track 12, which is shown partially broken away, according to an embodiment of the invention. The forward fixture 4 includes a pair of spanned apart (i.e., first and second) mounting brackets 16, 18. As depicted, mounting brackets 16 and 18 are identical to each other in design. Each mounting bracket 16 and 18 is comprised of upper and lower bracket portions 20a, 20b and 22a, 22b, respectively. As depicted, the cot 14 is mounted to the upper bracket portions 20a, 20b. The lower bracket portions 22a and 22b each provide a pair of rollers or wheels 24, 26. As depicted the wheel pairs 24, 26 are orientated relative to each other about a rotation axis traverse to each other.

Figure 8:
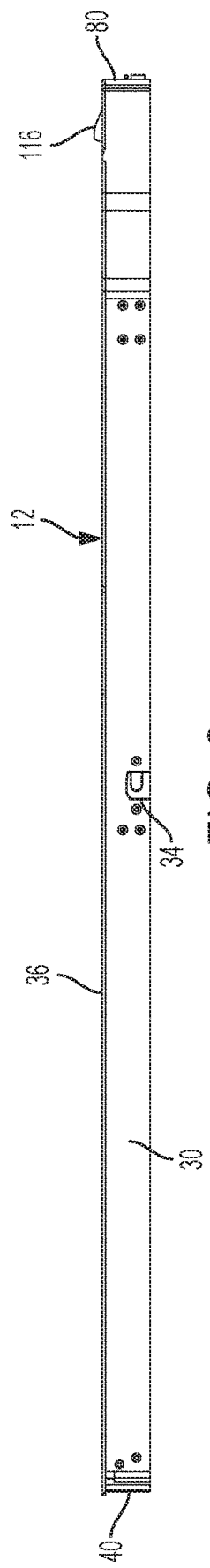
FIG. 8 is a first (left) side view of the cot fastener track of FIG. 3.
Figure 9:
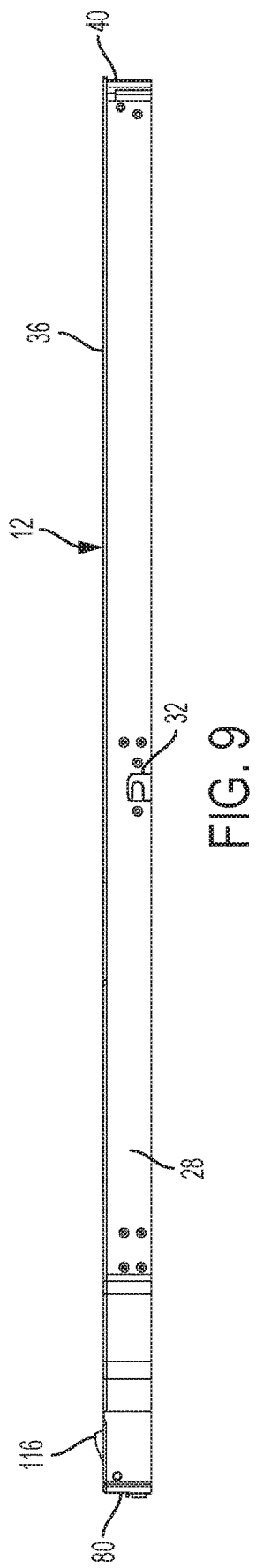
FIG. 9 is a second (right) side view of the cot fastener track of FIG. 3.

In the illustrated embodiment, the pairs of wheels 24, 26 are identical in size, but in other embodiments, wheels 24 do not have to be identical to wheels 26. The orientation of the wheels 24, 26 ensure that the cot 14 upon moving in the loading direction (FIG. 1A) smoothly engages the cot fastener track 12 between the mounting brackets 16, 18, and that the wheels 24, 26 smoothly travels thereon along respective sides/side tracks 28, 30 of the cot fastener track 12. Additionally, the location of the wheels 24, 26 on the mounting brackets 16, 18 are such that the wheels 24, 26 clear and pass over a respective one of pair of middle locks 32, 34 (the other middle lock 34 provided on other side 30 is depicted in FIG. 8), and under a roof plate 36 when moving the cot 14 in the loading direction (FIG. 1A) along the cot fastener track 12, and vice-verse when moving the cot 14 in the unloading direction (FIG. 1B).

It is to be appreciated that the roof plate 36 has a width which is greater than the greatest distance between each pair of wheels 24, 26 but less than the distance between the upper bracket portions 20a, 20b. In this manner, the wheels 24, 26 of the forward fixture 4 is retained between the roof plate 36 and the support surface (i.e., floor) 10 of the vehicle 8 in a first (vertical) direction Z, and by the sides 28, 30 in a second (side-to-side) direction Y. A front plate 40 (FIG. 1B) of the cot fastener track 12 is provided, which is wider than the distance between the sides 28, 30, such that the wheels 24, 26 of the forward fixture 4 are retained by the front plate 40 in a third (forwardly only) direction X.

With specific reference to FIG. 1A, the middle fixture 5 includes a pair of spanned apart (i.e., third and fourth) mounting brackets 42, 44. As depicted, mounting brackets 42, 44 are identical to each other in design. Each mounting bracket 42, 44 is comprised of upper and lower bracket portions 46a, 46b and 48a, 48b, respectively. As depicted, the cot 14 is mounted to the upper bracket portions 46a, 46b. The lower bracket portions 48a and 48b are each provided with a peg 50. As depicted each peg 50 is orientated relatively in axial alignment with respect to each other. In the illustrated embodiment, each of the pegs 50 is identical in size. The orientation and location of each peg 50 ensure that the cot 14 upon moving to a locking position in the loading direction (FIG. 1A) engages the respective middle lock 32, 34 of the cot fastener track 12, via each peg 50 coming to rest within each respect middle lock, between the mounting brackets 42, 44.

FIG. 2B shows a front perspective, partially broken away, of the cot transport vehicle provided with the cot fastening system of FIG. 1, and showing a close-up of the middle fixture 5 of the cot fixture assembly 3 that is provided to the emergency cot 14, which is shown with parts removed for easy of illustration and discussion, and which engages the cot fastener track 12, which is shown partially broken away, according to an embodiment of the invention. Each bracket 42, 44 of the middle fixture 5, likewise, provides a pair of rollers or wheels 51 orientated perpendicular to the sides 28, 30 of the cot fastener track 12. In some embodiments, an additional pair of rollers 53 (same of side not shown) may be provided to cot 14, such as to a bar 114 that spans between the brackets 42, 44. Together these rollers and/or wheels 51, 53 can act on the sides 28, 30 of the cot fastener track 12 to align the cot 14 side to side when being loading or unloading.

It is to be appreciated that the shape of an end portion of an interior surface 52 of each middle lock 32, 34 can be complimentary in shape but slightly larger to the exterior surface of each peg 50 in order to provide a firm engagement thereto at the end portion. In other embodiments, the end portion of the interior surface 52 can be larger than the exterior surface of the peg 50, and a gasket material may be provided there between to take up any such spacing. Any suitable gasket material such as metal, rubber, polymers, fibers, ceramics, etc. may be used. Additionally, although in the figures a particular shape (i.e., circular) of the peg 50 and end portion of the interior surface 52 of each middle lock 32, 34 is depicted in order to show as an example, any other geometrical shape may be provided in other embodiments, such as for example, as square, rectangle, oblong, and including non-complimentary shapes, so long as each peg 50 may be easily engaged and disengaged from the respective middle lock 32, 34 upon loading and unloading the cot 14 from the vehicle 8.

With reference to FIGS. 2A, 2B and 5, each middle lock 32, 34 has a roof portion 54 and a floor portion 56 in addition to the end portion of the interior surface 52, which together form a slot 58. As best shown by FIG. 5A, the slot 58 has a width which is greater than a neck portion 60 of the peg 50, but smaller than a head portion 62 of the peg 50. In this manner, the head portion 62 of the peg 50 of each middle fixture 5 is retained between the roof portion 54 and floor portion 56 of the respective middle 32, 34 in the first (vertical) direction Z, and by an inside portion 64 of the middle lock (or sides 28, 30 in another embodiment) and interior sides portions 66, 68 of the roof and floor portions 54, 56, respectively, in the second (side-to-side) direction Y. The end portion of the interior surface 52 retains the head portion 62 of each peg 50 in the third (forwardly only) direction X in the illustrated embodiment.

Figure 3:
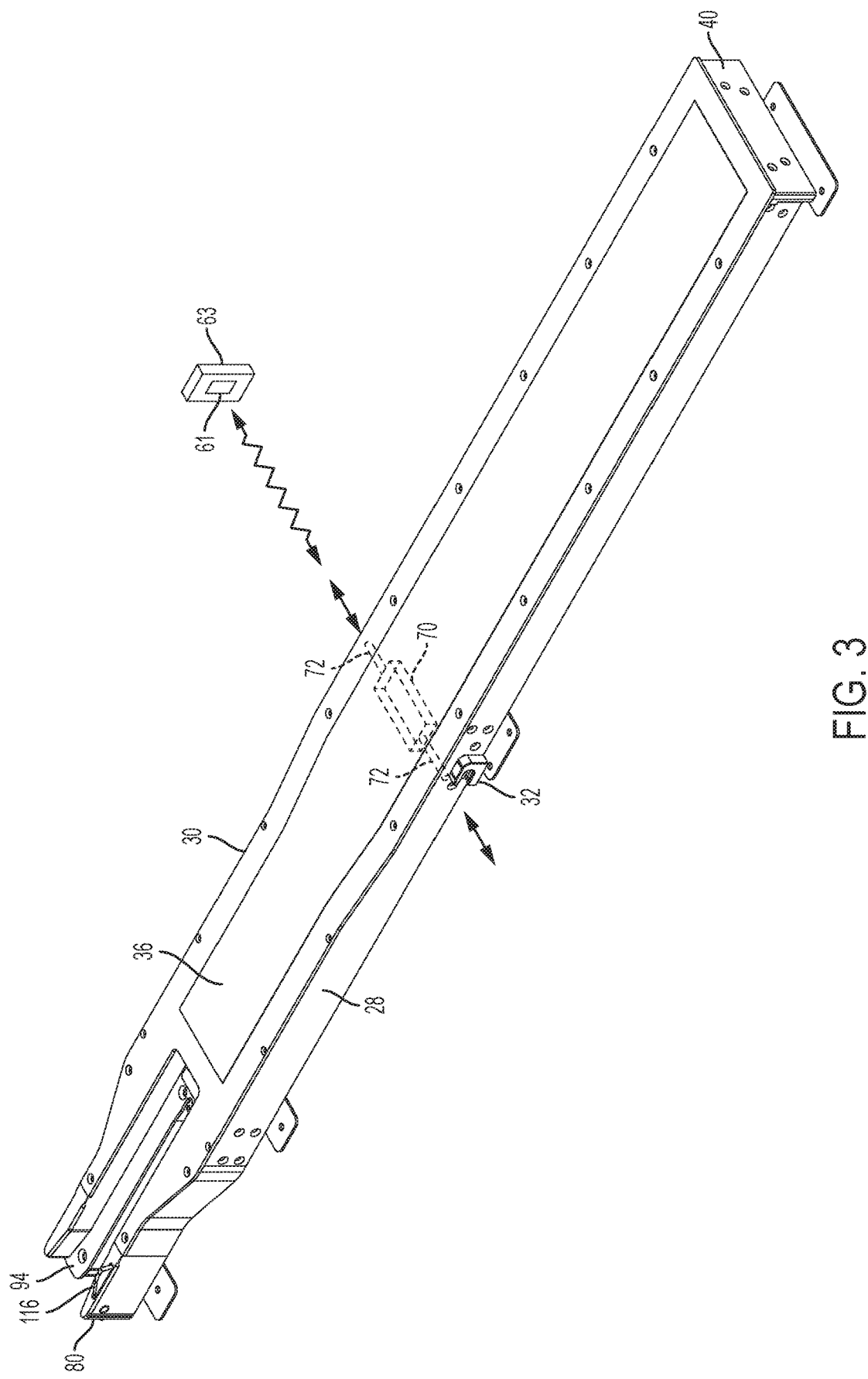
FIG. 3 is a front perspective view of the cot fastener track according to the embodiment of the cot fastening system of FIG. 1.
Figure 4:
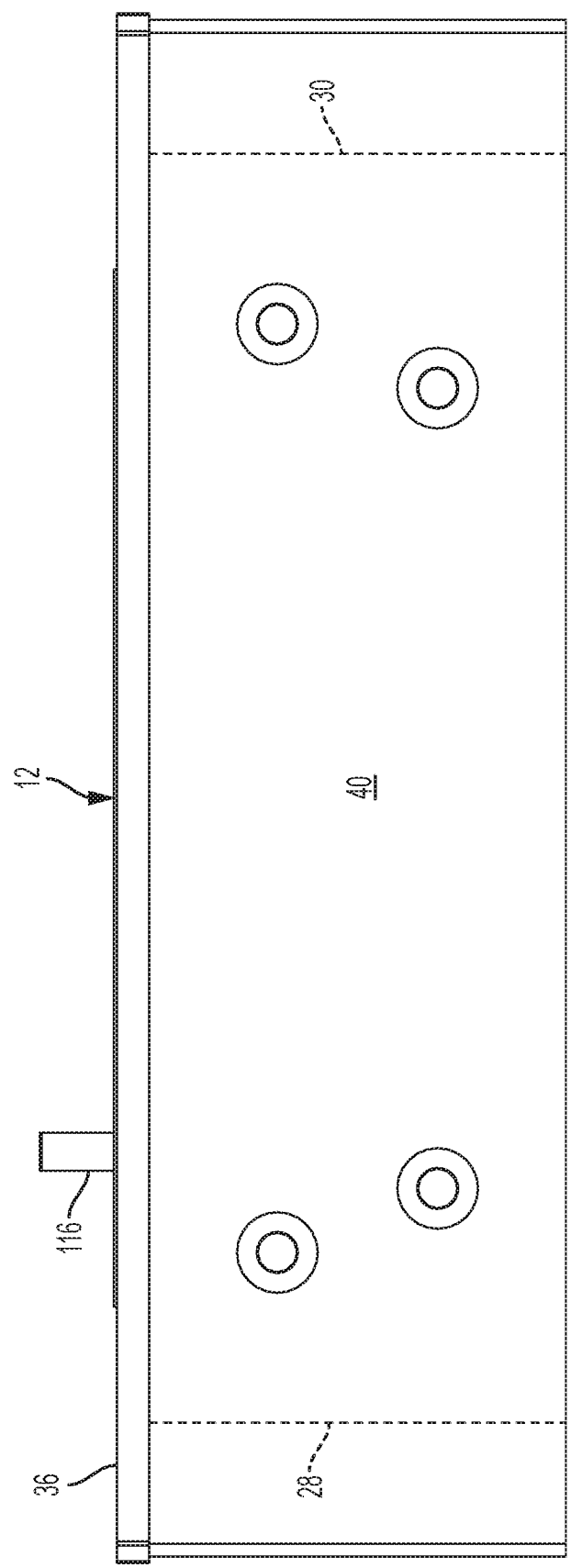
FIG. 4 is a front view of the cot fastener track of FIG. 3.
Figure 6:
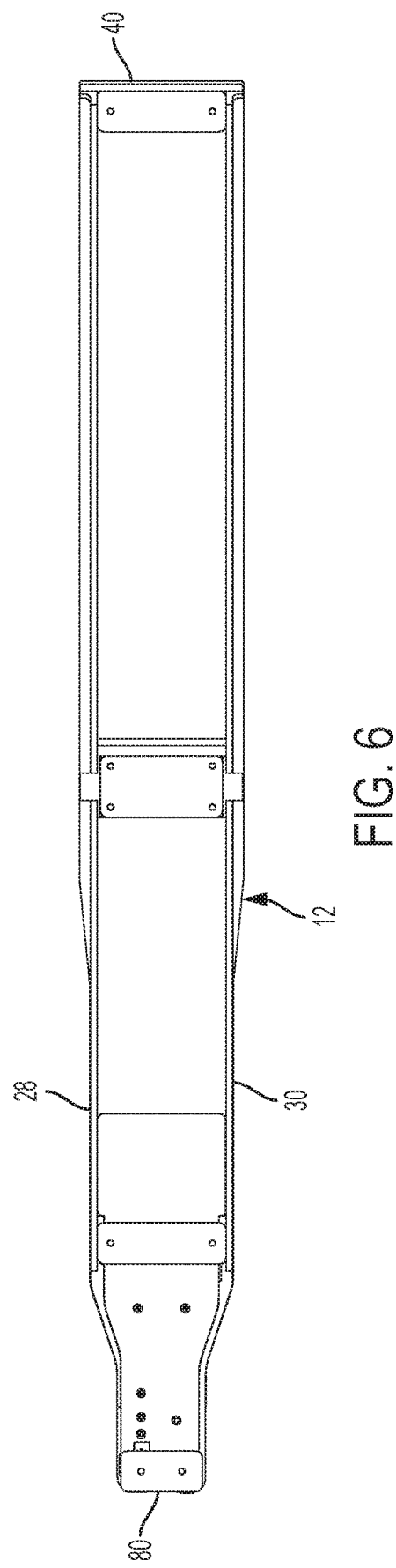
FIG. 6 is a bottom view of the cot fastener track of FIG. 3.

As best depicted by FIGS. 3 and 5, in some embodiments a blocking or catch member 70 can be provided by the cot fastener track 12 which has a pin or catch 72 for each middle lock 32, 34 (same on side 34). In such embodiments, the blocking or catch member 70 which can be selectively activated mechanically, electrically or combinations thereof, to block the peg 50 from being removed in the unloading direction and unblock the peg 50 when removal of the cot 14 from the cot fastener track 12 is intended. For example, via a (graphical) user interface 61 of a wireless remote control 63 can be provided to wirelessly control the locking and unlock of the pegs 50 from the middle lock 32, 34. Additionally, a hand actuator or pushbutton 78 can be provided at a back end 80 (or at some other convenient location) of the cot fastener track 12 for the same purpose.

Figure 7:
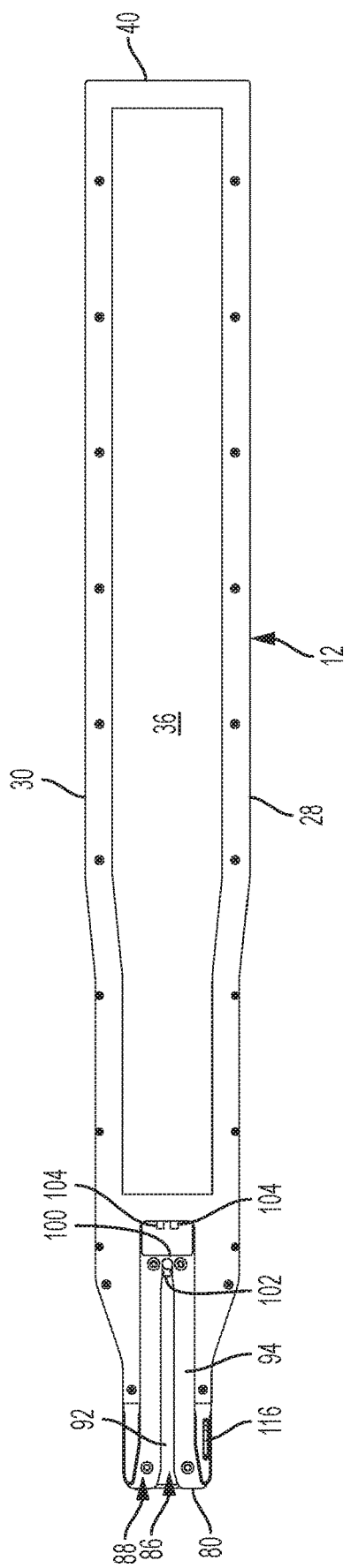
FIG. 7 is a top view of the cot fastener track of FIG. 3.

Turning now back to FIG. 1A, the rearward fixture 6 includes a post 81 that supports a rearward peg 82 and a rearward charging plate 84. In some embodiments, the rearward peg 82 and the rearward charging plate 84 are provided integral with the post 81, form a generally, upside down, cross-shaped component. As best shown by FIG. 7, the cot fastener track 12 adjacent the back end, provides a pair of inner and outer channels 86, 88, respectively, in which the inner channel 86 is located inside centrally thereto, and below the upper outer channel 88. As depicted, the channels 86, 88 extend longitudinally relative to the longest length of the cot fastener track 12 (i.e., the length extending generally parallel to the loading and unloading directions) and are centrally located between the sides 28 and 30. When loading the cot 14 in the loading direction, the rearward peg 82 is shaped and sized such that it enters into the inner channel 86 from the back end 80, and at the same time the rearward charging plate 84 is shaped and sized, such that it will enter into the upper outer channel 88.

With reference also made to FIGS. 5A and 5B, and in a similar fashion as to way in which the middle locks 32, 34 each engage and hold their respective peg 50, the inner channel 86 is shaped such that a head portion 90 (FIG. 1A) of the rearward peg 82 is retained by the inner channel 86 in the first (vertical) direction by a floor member 92 and an interior floor member 94, which defines the inner channel 86, as well as by interior sides portions 96, 98 of the inner channel 86 in the second (side-to-side) direction Y. An end portion 100 (FIG. 7) of the inner channel 86 (also defined by the interior floor member 94) retains the head portion 90 of rearward peg 82 in the third (forwardly only) direction X in the illustrated embodiment. In some embodiments, a rearward blocking or catch member 102 (FIG. 7) can be provided by the cot fastener track 12, which can be selectively activated mechanically, electrically or combinations thereof, to block the rearward peg 82 from being removed in the unloading direction, and unblock the rearward peg 82 when removal of the cot 14 from the cot fastener track 12 is intended. For example, the wireless remote 74 (FIG. 3) and/or pushbutton 78 (FIGS. 5A and 5B) can be used to control the locking and unlock of the rearward peg 82 from the rearward blocking or catch member 102. In some embodiments, the activation of the blocking or catch member 70, 102 can be automatic for blocking (via a contact switch, proximity sensor, hall effect sensor, magnetic switching, beam breaking, circuit forming, etc.) in the loading direction. In other embodiments, the activation of the blocking or catch member 70, 102 for unblocking in the unloading direction, may require activation of the same or different remote devices and/or pushbuttons to release the pegs from the middle locks 32, 34 and the inner channel 86. In still other embodiments, the sequence of blocking (locking) and/or unblocking (unlocking) of middle locks 32, 34 and/or the inner channel 86 may be simultaneous, or via a sequence (i.e., one after the other). In still some other embodiments, the manner in which the cot fastener track 12 engages with and releases the rearward peg 82 of the rearward fixture 6 can be similar to the manner described by U.S. Pat. Nos. 5,092,722 and 5,913,559, and for purposes of brevity, no further discussion thereon is provided.

During the loading and unloading sequence, in some embodiments, a safety hook (not shown) engages with the cot preventing the cot from being unloaded until released. This facilitates safe loading and unloading of the cot 14 as it is used to prevent the cot from being rolled off the ambulance until the legs of the cot have been positioned to support the weight of the cot. As the cot 14 has independently operated head end and foot end legs, the cot can be fitted with two features that engage with such a safety hook. In conventional versions, such a safety hook is a fixed hook and the feature of the cot 14 that engages with the safety hook is an open loop that could be moved out of position to allow the cot to be unloaded. In another embodiment, a movable safety hook can be provided which moves out of position, thereby allowing the cot 14 to be unloaded. For example, the safety hook can be connected to an actuator allowing the user to lower the safety hook remotely, e.g., by the wireless remote 74 (FIG. 3) and/or pushbutton 78 (FIGS. 5A and 5B).

It is to be appreciated that the cot fastener track 12 secures the cot 14 from five points: two at the front (patient's head end) adjacent the front plate 40, two from the middle of the cot, via the middle locks 32, 34, and one at the back (patient's foot end) adjacent the back end 80, via the inner channel 86. In some embodiments, the rear point (via the inner channel 86) has an active locking mechanism, i.e., the rearward blocking or catch member 102 (FIG. 7), and is the only point that secures the cot 14 from moving rearwards (towards the patients foot end) in the unloading direction. In other embodiments, the middle of the cot has an active locking mechanism (i.e., blocking or catch member 70), and is the only point that secures the cot 14 from moving rearwards (towards the patients foot end) in the unloading direction. In still other embodiment, the cot 14 may be secured at the middle and rear points via a respective active locking mechanism (i.e., blocking or catch member 70 and rearward blocking or catch member 102) in the unloading direction.

Referring again to FIGS. 1A, 5A, 5B and 7, when the cot 14 is fully loaded into the vehicle 8, and fixed and secured releasably therein by the cot fastener track 12, the rearward charging plate 84 of the rearward fixture 6, in some embodiment, is in electrical connect with an integrated charging system of cot fastener track 12. As best shown by FIGS. 5A and 5B, the electric connect is provided by one or more charging prong connectors 104 abutting firmly against an electrical contact area of the charging plate 84, allowing the cot 14, if battery operated, to be recharged whenever it is locked into the cot fastener track 12. In some embodiments, the one or more charging prong connectors 104 may be spring biased towards the charging plate 84 to help maintain the electrical connection there between, and provide inductive and/or conductive charging to the cot 14. In still other embodiments, data communications between the cot 14 and systems with the vehicle 8 and/or other remote data centers, such as a care facility, manufacture, etc., via in-vehicle communication pathways/networks (not shown) may also be provided via the electrical connection provided above or via other connection points provided to the cot 14 in a similar manner.

Some of the other noted advantageous of the system 2, and not limited thereto, are that the cot fastener track 12 has a clean profile which is easy to clean and safe for operators to walk over while the cot 14 is out of the vehicle 8. Angled surfaces as depicted by the various views of FIGS. 3-9, as well as the relatively reduced size in width of the roof plate 36 toward the vehicle rear entrance (depicted by edge 106 in FIG. 1A), i.e., adjacent the back end 80, as compared to its size in width forward of the middle locks 32, 34 up to adjacent the front plate 40, allow an operator to load the cot 14 even if it is misaligned to the cot fastener track 12.

Figure 10:
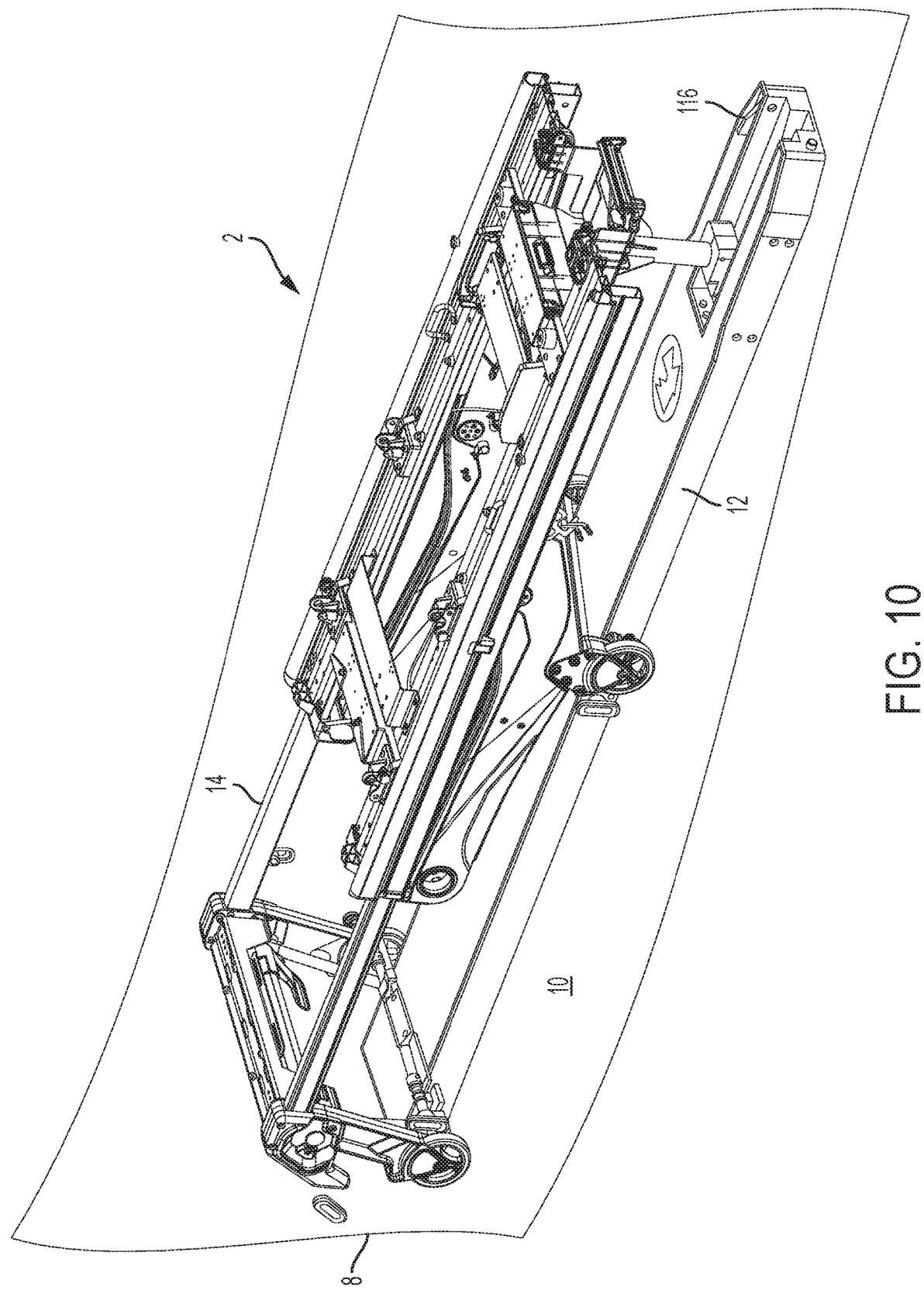
FIG. 10 depicts, a rear and side perspective of a cot transport/emergency vehicle, partially broken away, provided with a cot fastening system according to an embodiment of the invention which comprises a cot fastener track which is shown releasably securing an emergency cot, shown with parts removed for easy of illustration and discussion, via a cot fixture assembly of the system provided to the cot.

Referring now to FIG. 10, a rear and side perspective of the cot transport vehicle 8, partially broken away, is shown provided with the cot fastening system 2 according to an embodiment of the invention, and in which the cot fastener track 12 of the system 2 is shown releasably securing an emergency cot 14, also shown with parts removed for easy of illustration and discussion, via the cot fixture assembly 3 of the system 2 that has been provided to the cot 14.

Figure 11:
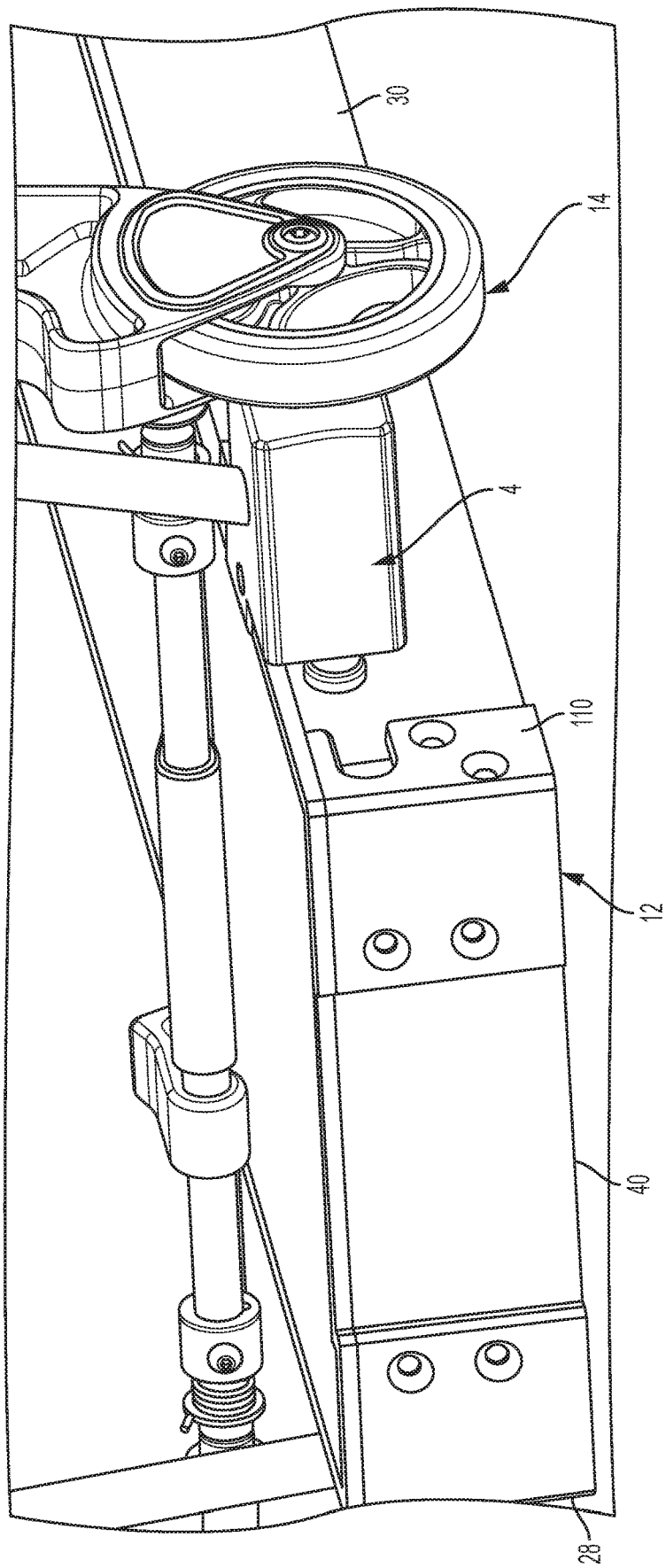
FIG. 11 depicts a forward fixture of the system of FIG. 1.
Figure 12B:
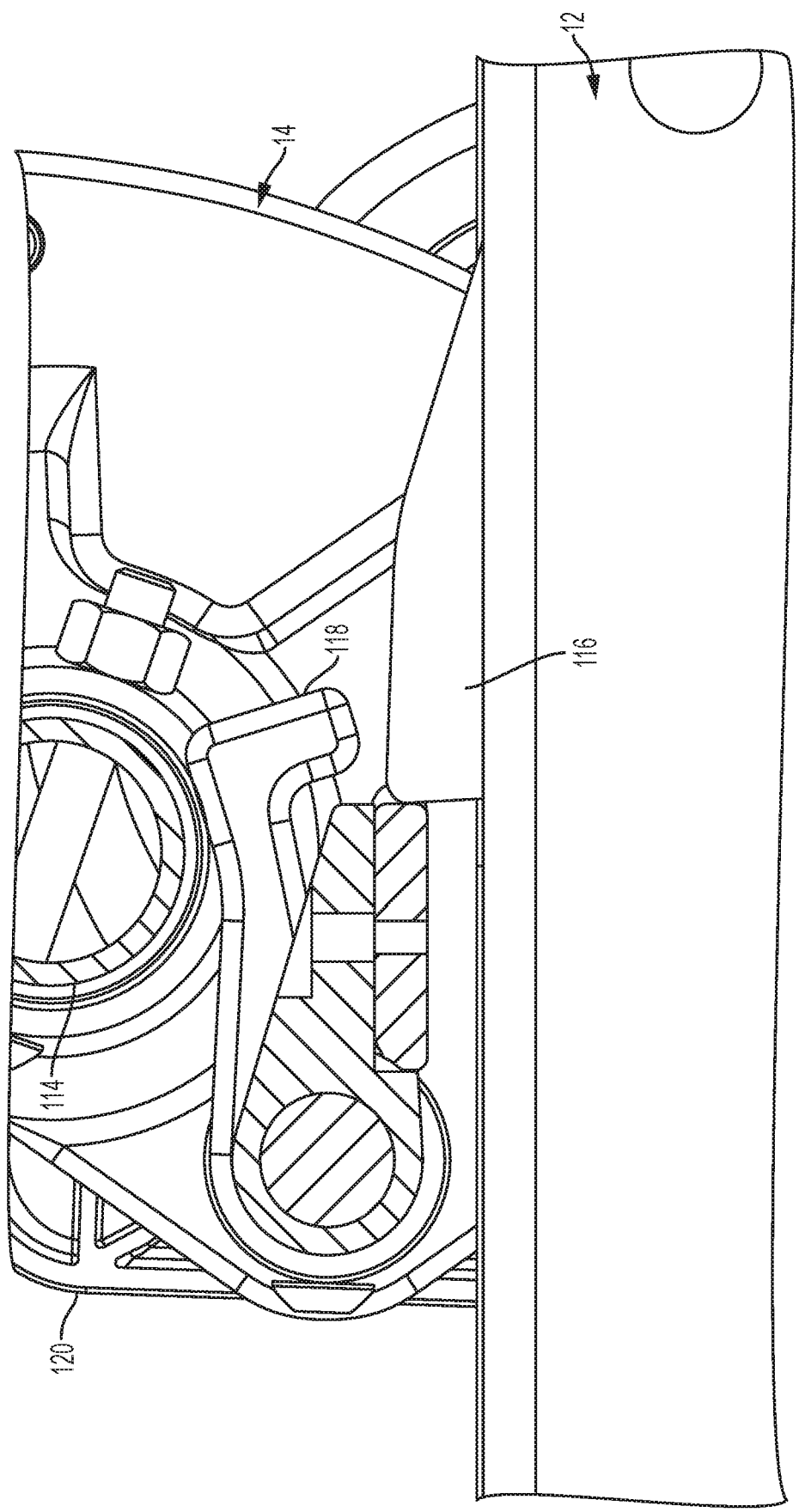
Figure 12C:
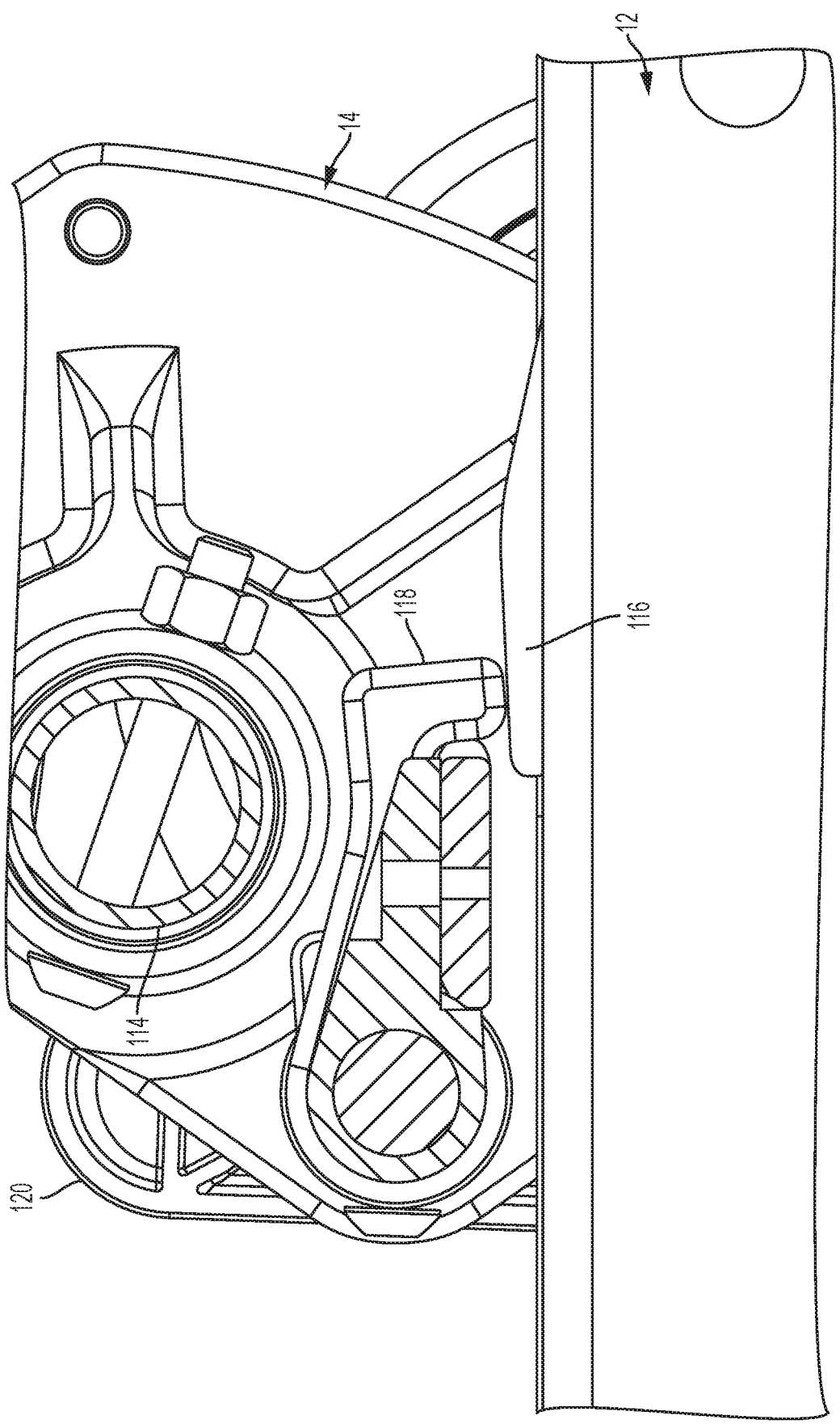
Figure 12D:
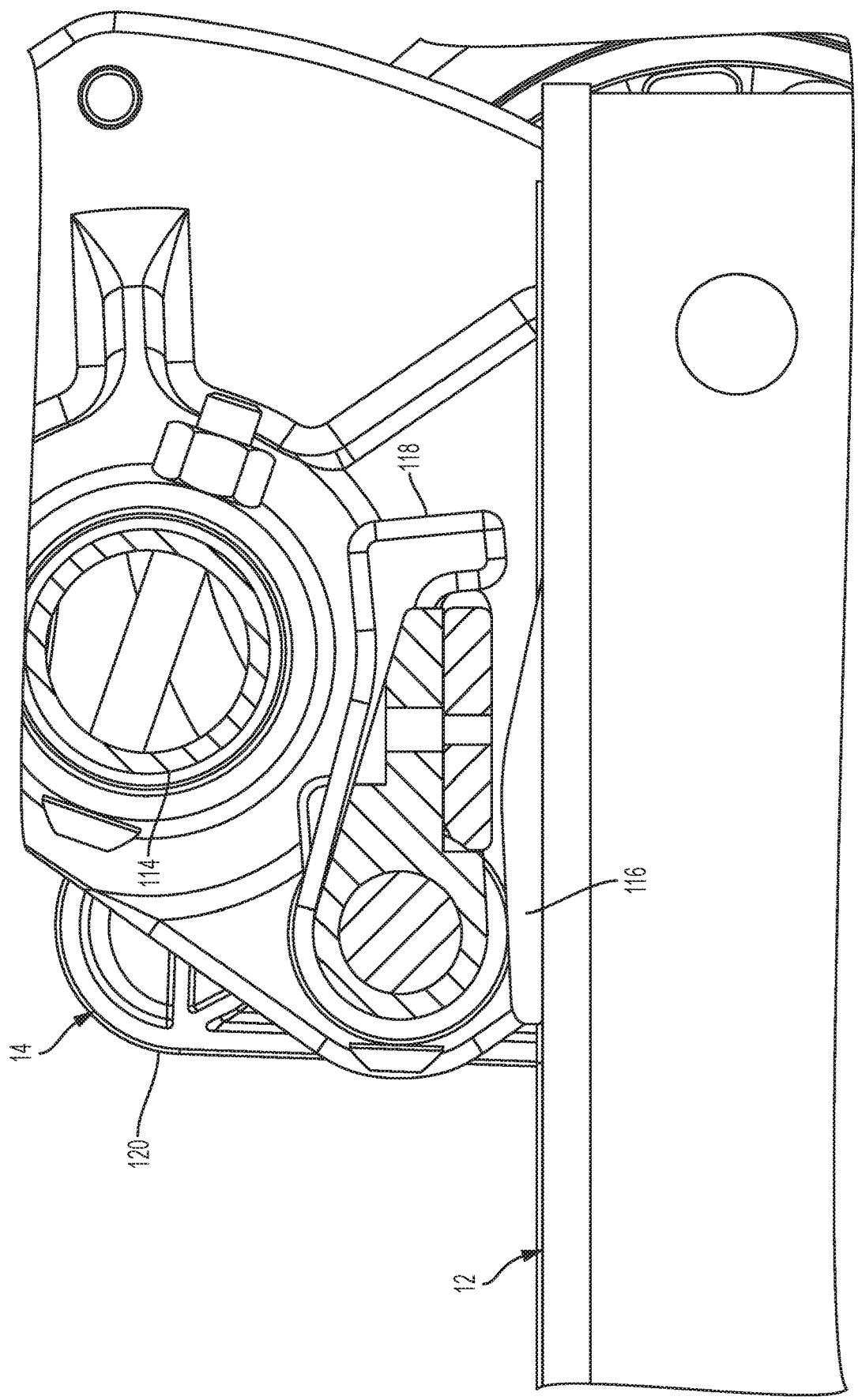

In still further embodiments, as depicted by FIG. 11, the forward fixture 4 may also be provided with a pair of forward pegs 108 (same on side 28 not shown) which engages into a respective one of a pair of open hook brackets 110 (same on side 28 not shown) provided adjacent the front plate 40.

In still further embodiments, two fixed bars of the cot e.g., a first bar 112 (FIG. 2A) to which the forward fixture attaches, and a second bar 114 (FIG. 2B) to which the middle fixture attaches) can be provided, and which can abut a safety hook 116, provided adjacent the back end 80 can be provided that is a spring loaded and biased toward the fixed bars. As depicted by the sequence shown by FIGS. 12A-12D, to unload the cot 14 a cam device 118 can be provided adjacent each of the first and second bars 112, 114, which pushes down the safety hook 116 to avoid the fixed bars. Each cam device 118 can be fitted to a lever 120 (one of which is best shown in FIG. 2B) to turn the cam device 118 such that it engages and pushes down the safety hook 116, when unloading. When loading, each of the cam devices 118 simply rides over the safety hook 116. In still other embodiments, the safety hook 116 can be fitted with a solenoid, and electronically controlled wirelessly via remote 74.

Figure 13:
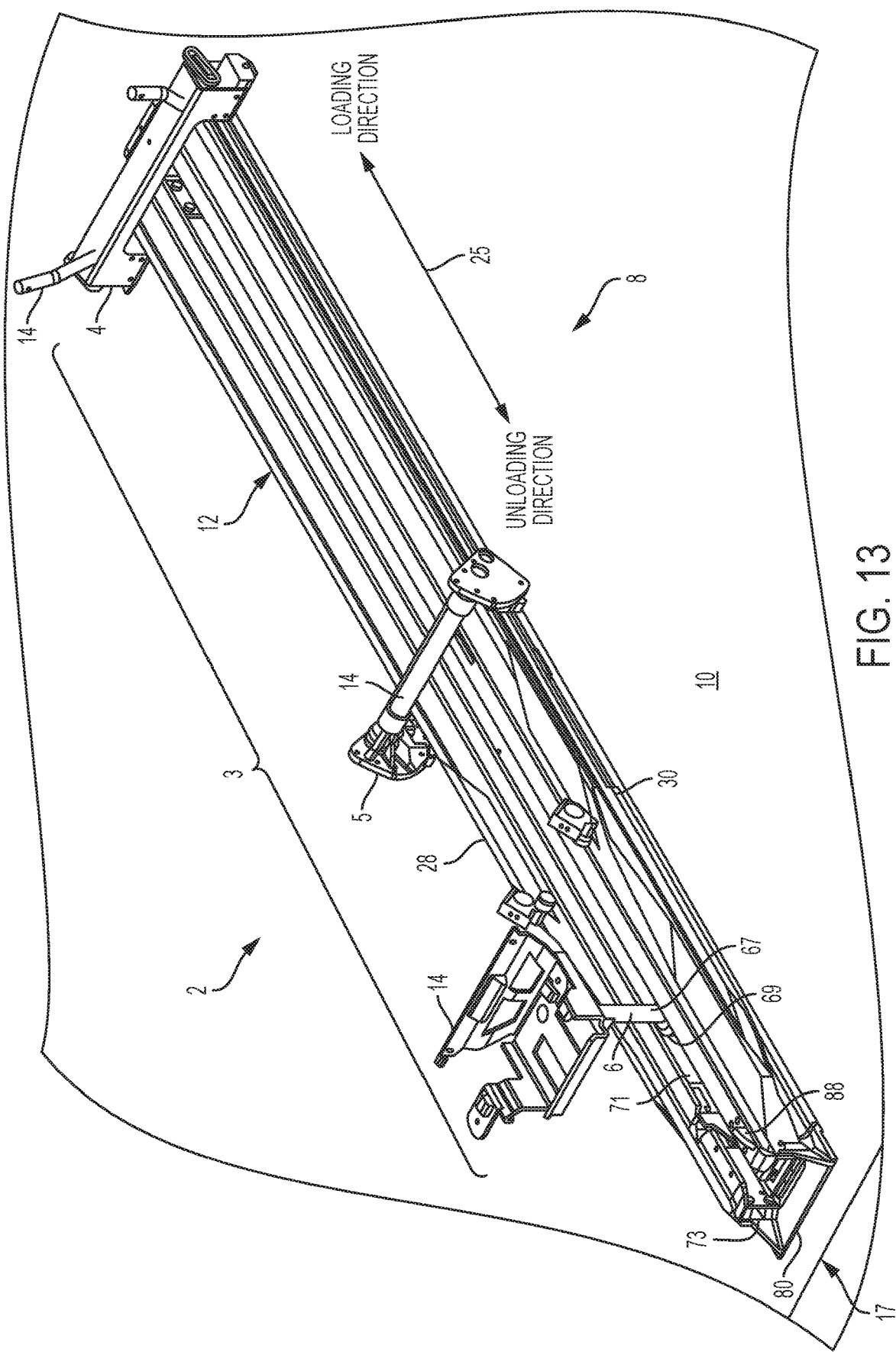
FIG. 13 depicts an elevational rear and (right) side perspective view of a cot transport/emergency vehicle, partially broken away, provided with a cot fastening system according to an embodiment of the invention which comprises a fastener track which is used to releasably secure an emergency cot, shown with parts removed for easy of illustration and discussion, via a cot fixture assembly provided to the cot and which is securable to the cot fastener track.
Figure 14:
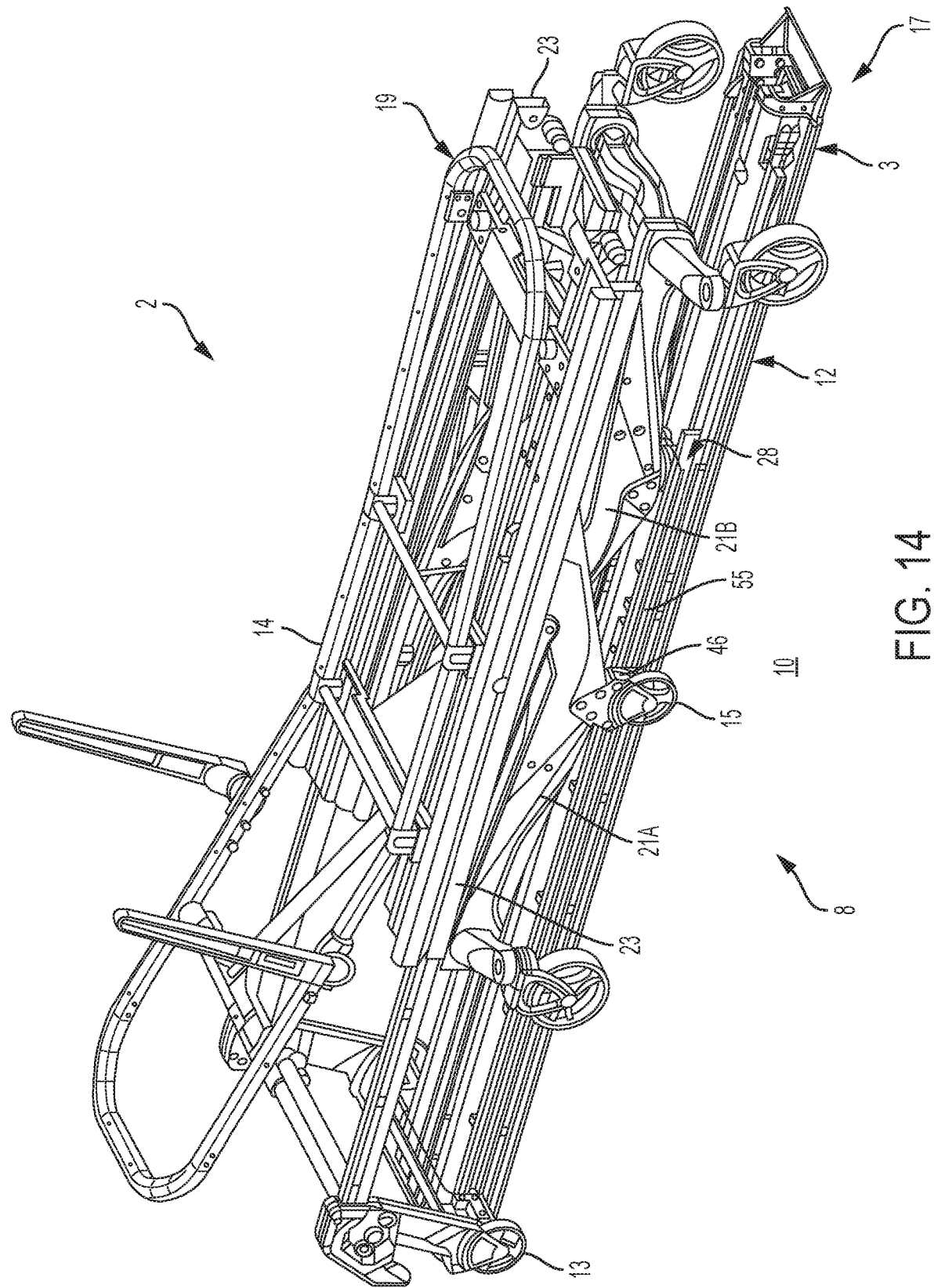
FIG. 14 depicts an elevational rear and (left) side perspective view of a cot transport/emergency vehicle, partially broken away, provided with the cot fastening system of FIG. 13 and showing an emergency cot secured thereto within the vehicle.

Referring now to FIGS. 13-20, another embodiment of the cot fastening system 2 is disclosed herein. Referring firstly to FIGS. 13 and 14, in this embodiment, the system 2 comprises a cot fixture assembly that is generally shown as reference symbol 3, and which can have in an embodiment, a forward fixture 4, a middle fixture 5, and/or a rearward fixture 6. The cot fixture assembly 3 can engage releasably within the cot transport vehicle 8, and in particular to a support surface 10 thereof, by a crash stable, cot fastener track 12, which also forms part of the system 2. A stated previously, the vehicle 8 typically comprises an ambulance or any other emergency rescue vehicle, such as a sprinter-type van, an airplane, a helicopter, a ship or any support structure subject to motion.

The cot fastener track 12 according to some embodiments is fitted to an ambulance, and secures during transit an emergency cot 14, parts of which have been largely removed in FIG. 13 for ease of illustration and discussion, but which is fully depicted in FIG. 14, as another illustrated example. It is to be appreciated that the cot fastener track 12 with the emergency cot 14 attached releasably thereto via the cot fixture assembly 3, is able to withstand the large forces generated if the ambulance was involved in a traffic accident (e.g., greater than 15 G's and up to 25 G's peak in either a front or side impact crash) and keep the emergency cot 14 attached thereto.

The cot fastener track 12 as well as the cot fastening system 2 has features that assist the operator during loading and unloading. For example, as shown by FIG. 14, the front of the emergency cot 14 can be fitted with a forward set of rollers or wheels 13 that align the cot 14 into the cot fastener track 12 as it is loaded. An aft set of rollers or wheels 15 on the cot 14 are also provided adjacent and more rearward i.e., closer to a loading edge 17 of the vehicle 8 than the cot's center of gravity when in a load position, and even when loaded with a patient, to prevent the cot 14 from tipping towards a foot end 19 of the cot as the cot is loaded or unloaded from the vehicle 8. It is to be appreciated that the load position of the cot 14 is depicted by FIG. 14, in which forward and rear sets of legs 21A, 21B, respectively, of the cot are located closely adjacent, i.e., generally parallel in their longest length to longitudinal extending side members 23 of the cot 14. When the aft set of rollers or wheels 15 are moved to a position on the support surface 10 adjacent the loading edge 17, the rear set of legs 21B may then be lowered to come into contact with the ground, thereby supporting the cot at the foot end 19. The forward set of rollers or wheels 13 may then also likewise be moved to a position on the support surface 10 adjacent the loading edge 17 such that the forward set of legs 21A may then be lowered to come into contact with the ground, thereby completing the unloading process with cot being supported fully by the legs 21A, 21B in a raised position (i.e., the longest length of the legs 21A, 21B being non-parallel to longitudinal extending side members 23 of the cot 14).

During loading of the cot 14 into the vehicle 8, the above mentioned moving and positioning of the legs 21A, 21B and wheels 13, 15 are conducted in reverse. Additionally, it is to be appreciated that in this embodiment the forward fixture 4 is the first fixture of the system 2 that is engaged in the cot fastener track 12, the middle fixture 5 is the second fixture of the system 2 that is engaged in the cot fastener track 12, and the rearward fixture 6 is the third (and last) fixture of the system 2 that is engaged in the cot fastener track 12 when loading the emergency cot 14 into the vehicle 8 in a loading direction indicated by arrow 25 depicted in FIG. 13. Likewise, in this embodiment, the rearward fixture 6 is the first fixture of the system 2 that is disengaged from the cot fastener track 12, the middle fixture 5 is the second fixture of the system 2 that is disengaged from the cot fastener track 12, and the forward fixture 4 is the third (and last) fixture of the system 2 that is disengaged from the cot fastener track 12 when unloading the emergency cot 14 from the vehicle 8 in the unloading direction indicated by the arrow 25.

Figure 15:
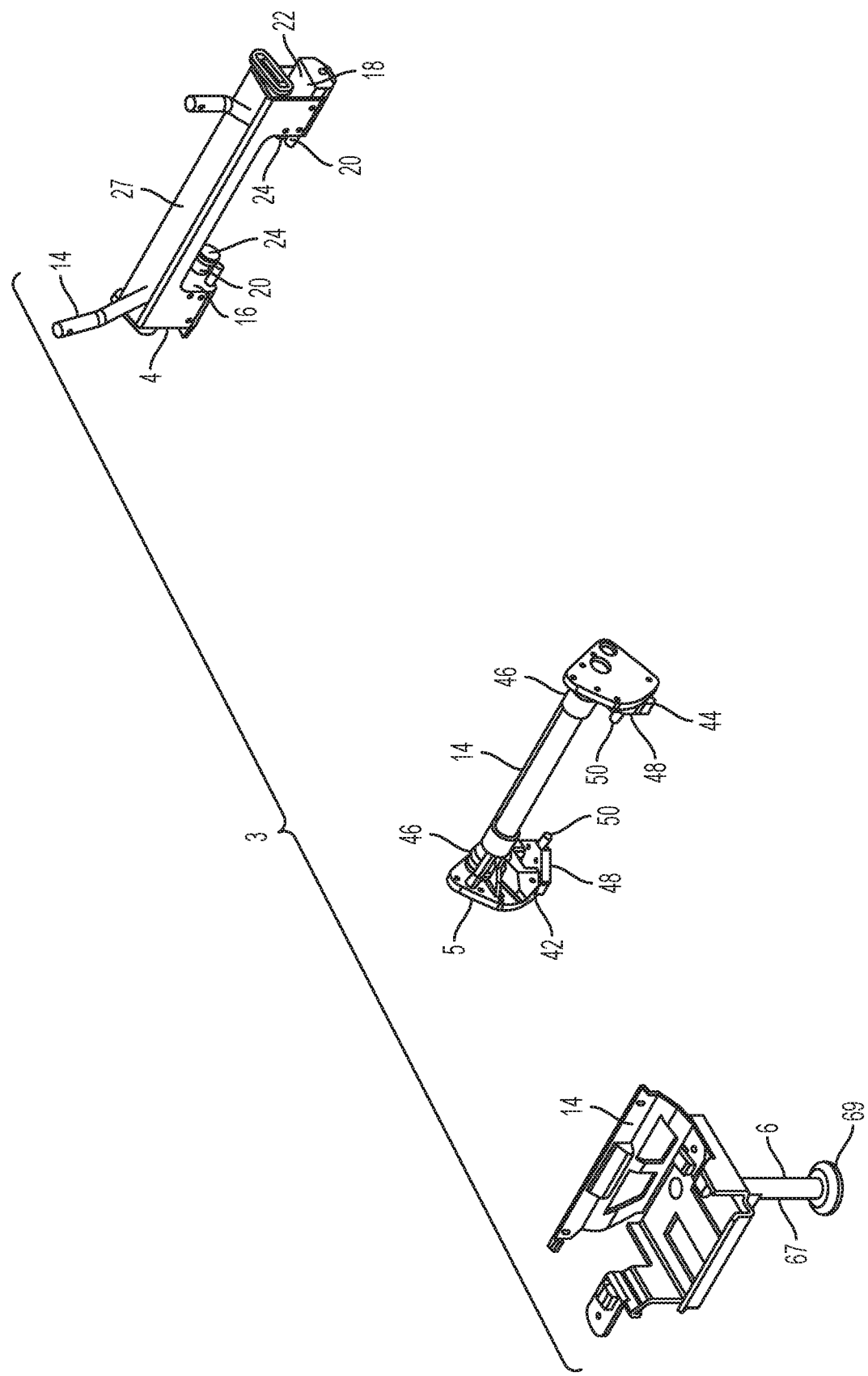
FIG. 15 depicts an elevational rear and (right) side perspective view of the components of the cot fixture assembly of FIG. 13, with the an emergency cot shown with parts removed for easy of illustration and discussion.
Figure 16:
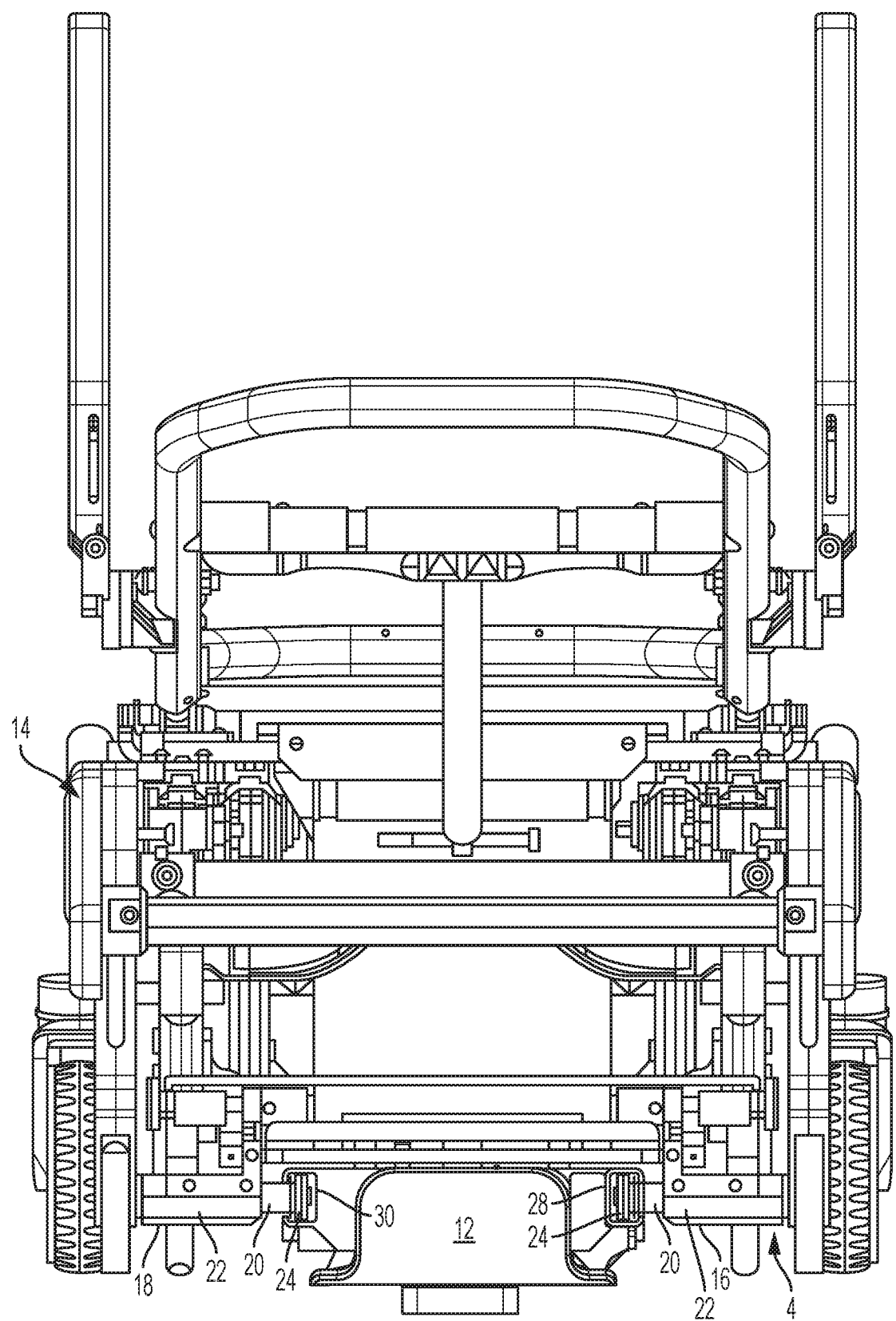
FIG. 16 depicts a rear perspective view of the cot fastening system of FIG. 14.

FIG. 15 depicts a rear and (right) side perspective view, partially broken away, of the cot fixture assembly 3 of FIG. 13, which permits the cot 14 to engage the cot fastener track 12 according to an embodiment of the invention. The forward fixture 4 includes a pair of spanned apart (i.e., first and second) mounting brackets 16, 18. As best depicted by FIG. 16, which shows a front view of the cot fastener track 12 securing the cot 14 via the cot fixture assembly 3 (FIG. 15), mounting brackets 16 and 18 are identical to each other in design. Each of the mounting brackets 16 and 18 is comprised of inner and outer bracket portions 20 and 22, respectively. As depicted, each inner bracket portion 20 provides a roller or wheel 24, in which the cot 14 is mounted to the outer bracket portion 22 of each of the mounting brackets 16, 18 via a cross-member bracket 27. As depicted the wheels 24 are identical in size and are orientated relative to each other about a respective rotational axis that are substantially parallel to each other. It is to be appreciated that the orientation of the wheels 24 relative to each other ensures that the cot 14 upon moving in the loading direction or unloading direction (FIG. 13) smoothly engages the cot fastener track 12 between the mounting brackets 16, 18, and that the wheels 24 smoothly travels thereon along respective side tracks 28, 30 of the cot fastener track 12.

Figure 17:
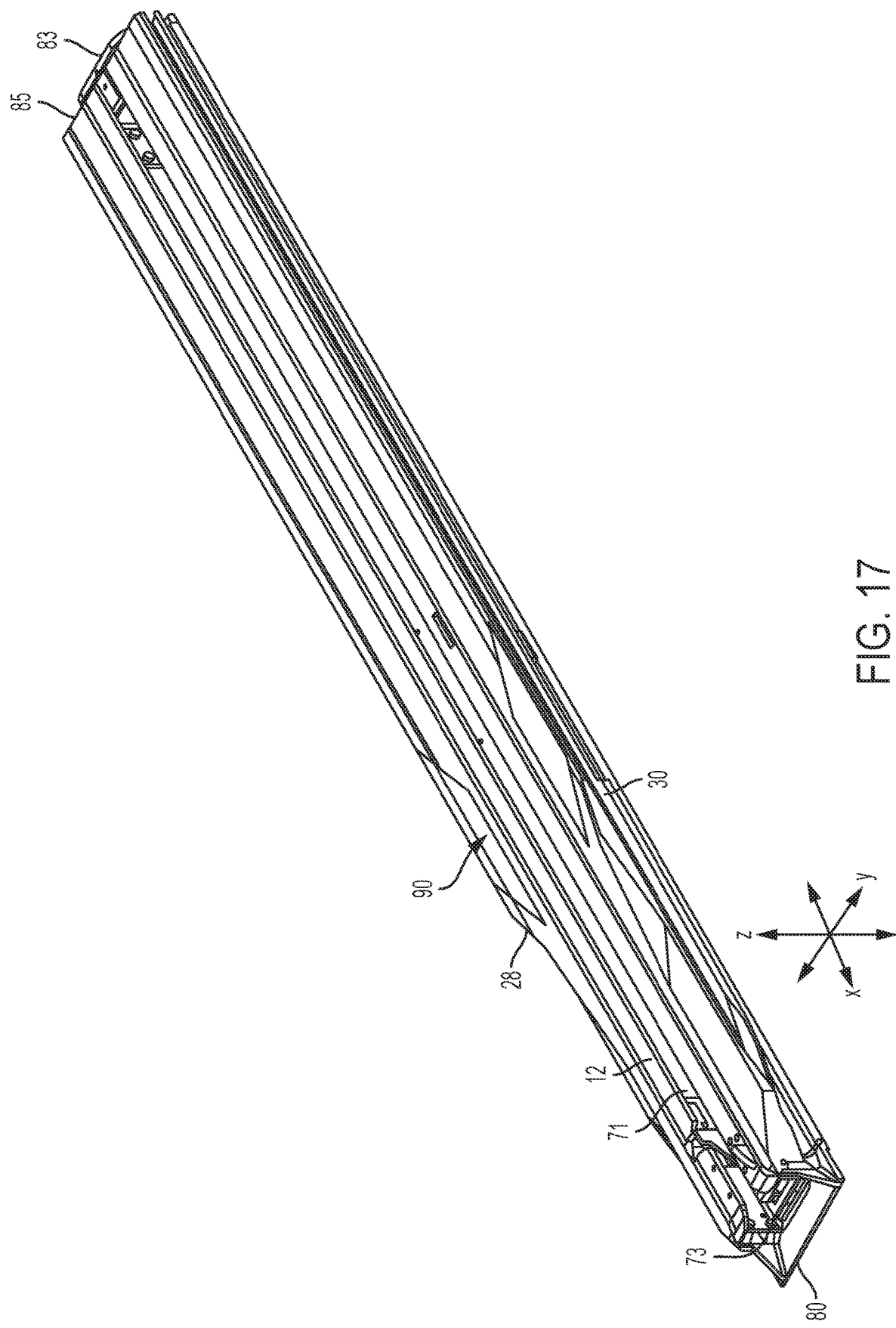
FIG. 17 depicts an elevational rear and (right) side perspective view of the cot fastener track according to the embodiment of the cot fastening system of FIG. 13.
Figure 18:
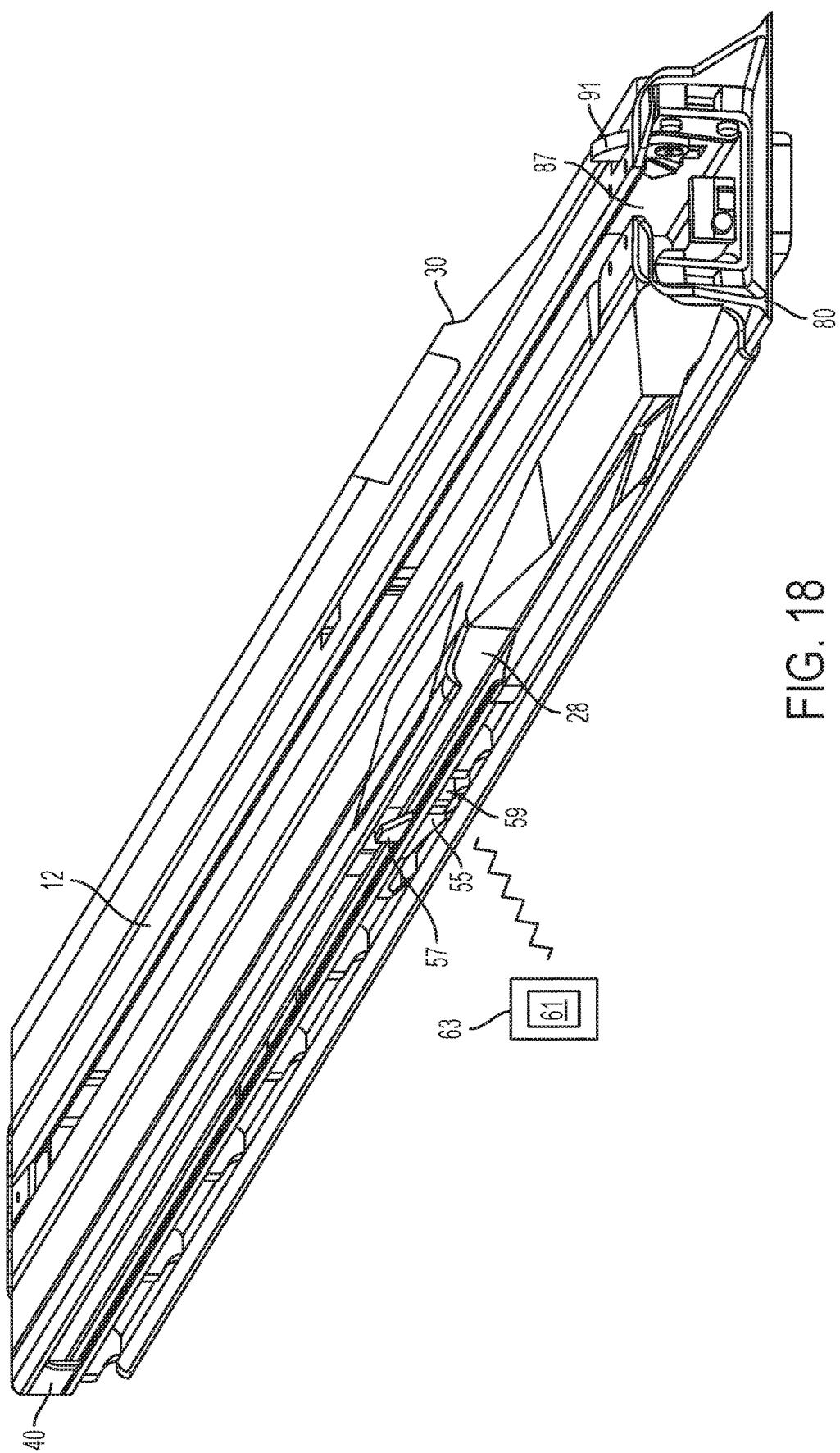
FIG. 18 depicts an elevational rear and (left) side perspective view of the cot fastener track according to the embodiment of the cot fastening system of FIG. 13.

As best depicted by FIG. 16, the outside width between the side tracks 28, 30 is greater than the greatest distance between the wheels 24 but less than the distance between the outer bracket portions 22. Additionally, as depicted by FIGS. 17 and 18, showing right and left side perspectives views, respectively, of the cot fastener track 12, the side tracks 28, 30 are channels each having a generally C-shape in the illustrated embodiment, which span a majority of the longitudinal length of the cot fastener track 12. In other embodiments, other channel shapes for the side tracks 28, 30 may be used.

Figure 19:
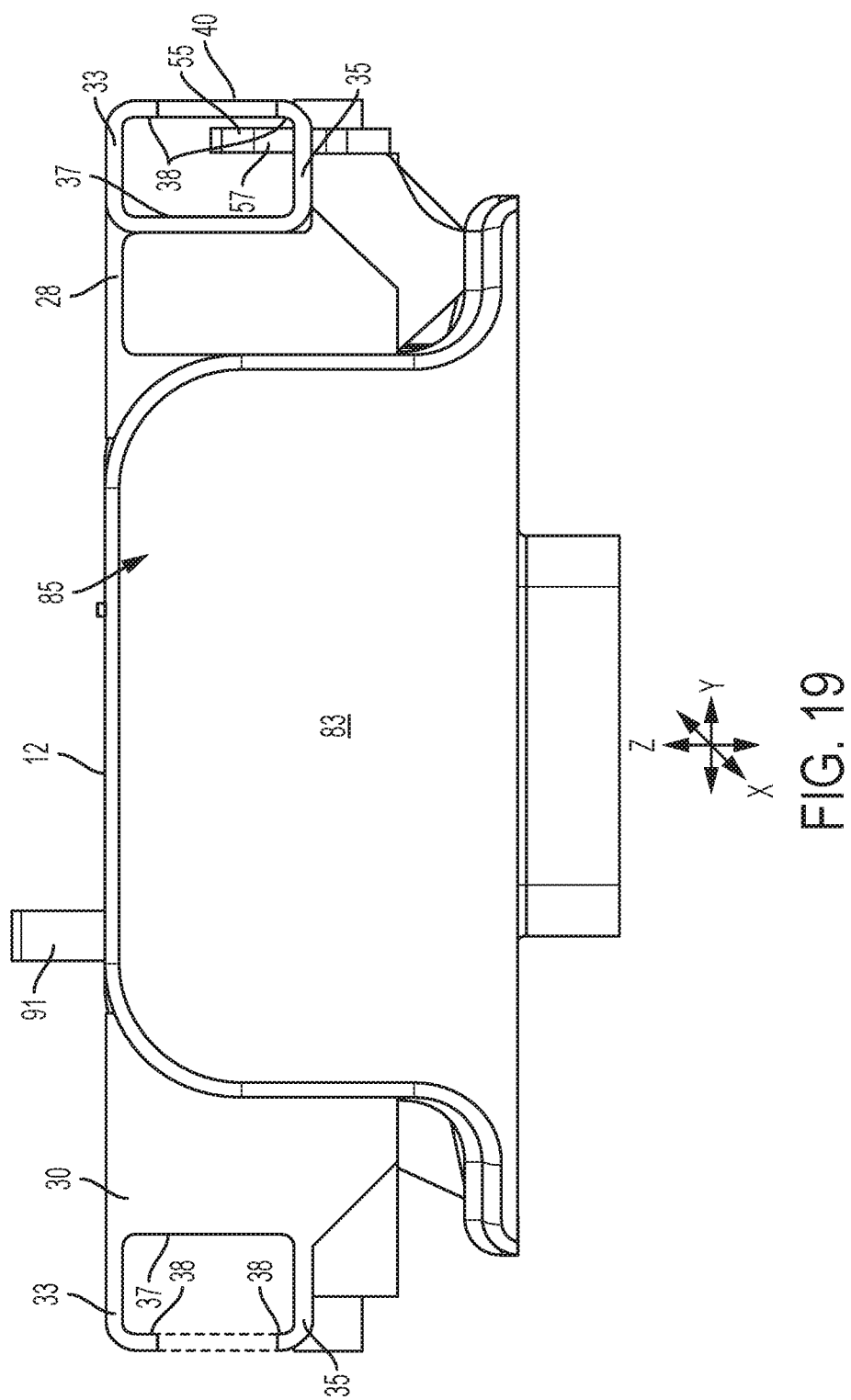
FIG. 19 depicts a front view of the cot fastener track of FIG. 17.
Figure 20:
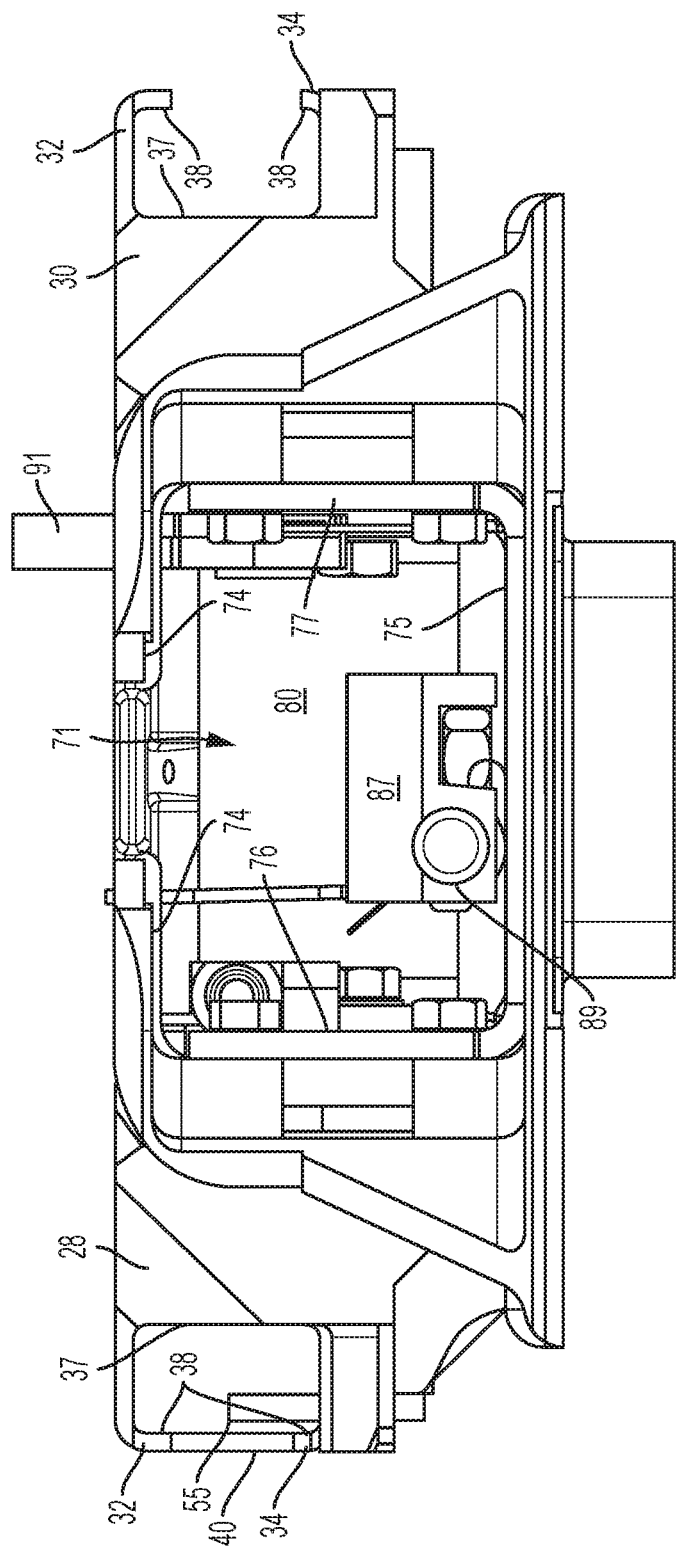
FIG. 20 depicts a back view of the cot fastener track of FIG. 17.

In the illustrated embodiment, and with reference made also to FIGS. 19 and 20, the wheels 24 of the forward fixture 4 are retained between upper and lower channel portions 33, 35 in a first (vertical) direction Z, and by inner and outer interior side channel portions 37, 38 in a second (side-to-side) direction Y when the cot 14 is attached to the cot fastener track 12 and fully loading into the vehicle 8. A front plate 40 (FIG. 18) at the front end of the cot fastener track 12 is provided to one of the side tracks, namely side track 28 in one embodiment, but in other embodiments such a front plate may also be provided to the other or both of the side tracks. As provided, forward rolling progress of the wheels 24 of the forward fixture 4 is stopped by the front plate 40 in a third (forwardly only) direction X, when the cot 14 is attached to the cot fastener track 12 and fully loading into the vehicle 8 as depicted by FIG. 14.

Referring back to FIG. 15, the middle fixture 5 includes a pair of spanned apart (i.e., third and fourth) mounting brackets 42, 44. As depicted, mounting brackets 42, 44 are identical to each other in design. Each mounting bracket 42, 44 is comprised of upper and lower bracket portions 46 and 48, respectively. As depicted by FIG. 14 (same on side not shown), in one embodiment, the upper bracket portions 46 are mounted to the forward set of legs 21A adjacent or between the aft set of rollers or wheels 15. The lower bracket portions 48 each provide a peg 50 as shown by FIG. 15. In still other embodiments, each mounting bracket 42, 44 of the middle fixture 5 may be provided with a roller or wheels instead of the peg 50, similar in size and orientation to rollers or wheels 24.

In the illustrated embodiment, each of the pegs 50 is identical in size and orientated relative to each other to be axially aligned. It is to be appreciated that the outside width between the side tracks 28, 30 is greater than the distance between the pegs 50, but that the width between the inner interior side channel portions 37 of the side tracks 28, 30 is less than the width between the pegs 50. In this manner, and with reference made also to FIGS. 19 and 20, the pegs 50 of the middle fixture 5 are retained between the upper and lower channel portions 33, 35 in the first (vertical) direction Z, and by inner and outer interior side channel portions 37, 38 in the second (side-to-side) direction Y, when the cot 14 is attached to the cot fastener track 12 and fully loading into the vehicle 8.

The orientation, location and sizing of each peg 50 ensure that the cot 14 upon moving in the loading direction (FIG. 13), that the pegs 50 extend into and move freely along their respective side tracks 28, 30 between the upper and lower channels portions 33, 35. Upon the cot 14 being stop by the front plate 40, a latch 55 provided in at least one of the side tracks (namely side track 28 in one embodiment, but in other embodiments may be the other side track or both) blocks the movement/pathway of the respective peg 50 in the unloading direction (FIG. 13) such that when the cot 14 is attached to the cot fastener track 12 and fully loading into the vehicle 8, the cot 14 is retained and secured against unintended movement in the X, Y and Z directions.

With reference to FIG. 18, it is to be appreciated that the shape of an abutting surface 57 of the latch 55 can be complimentary in shape but slightly larger to the exterior surface of each peg 50 in order to provide a firm engagement there between. In other embodiments, the abutting surface 57 of the latch 55 can be larger than the exterior surface of the peg 50, and a gasket material may be provided there between to take up any such spacing. Any suitable gasket material such as metal, rubber, polymers, fibers, ceramics, etc. may be used. Additionally, although in the figures a particular shape (i.e., a circular exterior) of the peg 50 and the abutting surface 57 of the latch 55 is depicted in order to show one example, any other geometrical shape may be provided in other embodiments, such as for example, as square, rectangle, oblong, and including non-complimentary shapes, so long as the respective peg 50 may be easily abutted and/or engaged and disengaged from the respective latch 55 upon loading and unloading the cot 14 from the vehicle 8.

In one embodiment, the latch 55 can be selectively activated mechanically, electrically or combinations thereof to block the peg 50 from being removed in the unloading direction, and to unblock the peg 50 when the removal of the cot 14 from the cot fastener track 12 is intended. For example, the latch 55 may be spring biased in an up (blocking) position such that the respective wheel 24 and peg 50 can roll over and push down the latch 55 in the loading direction, which then springs back to the blocking position after each roll over to prevent the cot 14 from being able to move unintentionally in the unloading direction. To unblock the latch 55 from the pathway of the respective peg 50 and wheel 24 such that the cot 14 can be moved in the unloading direction, in one embodiment the latch 55 can be operated to move down via a solenoid actuator 59. The solenoid actuator 59 can be wirelessly activated to move/rotate the latch 55 downward and out of the pathway of the respective peg 50 and wheel 24 via a wireless remote control 63 provided, for example, with a (graphical) user interface 61 to wirelessly control the latch 55. Additionally, in other embodiments, a mechanical hand actuator and/or electric pushbutton can be provided, for example, at a back end 80 (or at some other convenient location) of the cot fastener track 12 for the same purpose.

Turning now back to FIGS. 13 and 15, the rearward fixture 6 includes a post 67 that supports a foot 69. As best shown by FIG. 13, the cot fastener track 12 provides a central channel 71 that extends longitudinally relative to the longest length of the cot fastener track 12 (i.e., the length extending generally parallel to the loading and unloading directions) and is centrally located between the side tracks 28 and 30. When loading the cot 14 in the loading direction, the foot 69 is shaped and sized such that it enters into the central channel 71 through a defined channel opening 73 provide at the back end 80.

With reference also made to FIG. 20, and in a similar fashion as to the way in which the side tracks 28, 30 retain the rollers or wheels 24, the central channel 71 has a general C-shaped such that the foot 69 (FIG. 13) is retained by the central channel 71 in the first (vertical) direction by a roof member 74 and a floor member 75, as well as by interior sides portions 76, 77 of the central channel 71 in the second (side-to-side) direction Y, which all together defines the central channel 71. A front end plate 83 of fastener track 12 caps or closes off the central channel 71 at a front end 85. In some embodiments, a rearward blocking or catch member 87 can be provided by the cot fastener track 12, which can be selectively activated mechanically, electrically or combinations thereof, to block the foot 69 from being removed in the unloading direction, and to unblock the foot 69 when removal of the cot 14 from the cot fastener track 12 is intended. For example, the wireless remote control 63 (FIG. 18) and/or a pushbutton 89 can be used to control the locking and unlocking of the foot 69 from the rearward blocking or catch member 87. In some embodiments, the activation of the latch 55 and/or the blocking or catch member 87 can be automatic for blocking (via a contact switch, proximity sensor, hall effect sensor, magnetic switching, beam breaking, circuit forming, etc.) in the loading direction. In other embodiments, the activation of the blocking or catch member 87 for unblocking in the unloading direction, may require activation of the same or different remote devices and/or pushbuttons used to clear the pathways of the wheels 24 and pegs 50 along respective side tracks 28, 30. In still other embodiments, the sequence of blocking (locking) and/or unblocking (unlocking) of side tracks 28, 30 and/or the central channel 71 may be simultaneously, or via a sequence (i.e., one after the other). In still some other embodiments, the manner in which the cot fastener track 12 engages with and releases the foot 69 of the rearward fixture 6 can be similar to the manner described by U.S. Pat. Nos. 5,092,722 and 5,913,559, which are incorporated herein fully by reference, and for purposes of brevity, no further discussion thereon is provided.

During the unloading sequence, typically a safety hook engages with the cot to prevent the cot from being unloaded until released. This feature facilitates the safe loading and unloading of the cot 14 as the safety hook is used to prevent the cot from being rolled off the vehicle until the legs of the cot have been positioned to support the weight of the cot. As the cot 14 in one embodiment may have independently operated head end and foot end legs, the cot can be fitted with two features that engage with such a safety hook. In conventional versions, such a safety hook is a fixed hook and the feature of the cot 14 that engages with the safety hook is an open loop that could be moved out of position to allow the cot to be unloaded. In an embodiment according to the present invention, a spring biased safety hook 91, biased in the up position as depicted in FIG. 18, can be provided which is shaped and configured to move out of position automatically via being pushed downwardly by the open loop(s) of the cot riding over when loading the cot 14 in the loading direction, but which has to be manually moved downwards to thereby allow the cot 14 to be removed from the cot fastener track 12 in the unloading direction and fully unloaded from the vehicle 8. In other embodiments, for example, the safety hook 91 can be connected to a solenoid actuator, thereby allowing the user to lower the safety hook remotely, e.g., by the wireless remote control 63 and/or via a provided pushbutton.

It is to be appreciated that the cot fastener track 12 in this embodiment secures the cot 14 from five points: two at the front (patient's head end) adjacent the front end plate 83 via the rollers or wheels 24 engaged in the side tracks 28, 30; two from the middle of the cot via the pegs 50 engaged also in the side tracks 28, 30; and one at the back (patient's foot end) adjacent the back end 80 via the foot 69 engaged in the central channel 71. In some embodiments, the rearward blocking or catch member 87 is the only means that secures the cot 14 from moving rearwards (towards the patients foot end) in the unloading direction. In other embodiments, the middle of the cot has one or more active locking mechanisms (i.e., latch 55), and is the only means that secures the cot 14 from moving rearwards (towards the patients foot end) in the unloading direction. In still other embodiment, the cot 14 may be secured at the middle and rear points via a respective active locking mechanism (i.e., latch 55 and rearward blocking or catch member 87) in the unloading direction.

When the cot 14 is fully loaded into the vehicle 8, and fixed and secured releasably therein by the cot fastener track 12, in some embodiments, the peg(s) 50 of the middle fixture 5 and/or the foot of the rearward fixture 6 is in electrical connect with an integrated charging system of fastener track 12, thereby allowing the cot 14, if battery operated, to be recharged whenever it is locked into the cot fastener track 12. In some embodiments, other charging points along the cot fastener track 12 may conveniently be provided to engage charging prongs provided on the cot 14, and provide inductive and/or conductive charging to the cot 14.

Referring now to FIGS. 21-33, another embodiment of a cot fastening system 202 is disclosed herein. The system 202 comprises a cot fixture assembly that is generally shown as reference symbol 203, and which can have in this embodiment a forward fixture 204, a middle fixture 205, a rearward fixture 206, and secondary middle fixture 207. As with the previous embodiment, the cot 14 provided with the fixture assembly 203 can be secured releasably within the cot transport vehicle 8, and in particular to a support surface 10 thereof, by a crash stable, cot fastener track 212, which also forms part of the system 202. When loading the emergency cot 14 into the vehicle 8 in a loading direction indicated by the arrow 25, the forward fixture 204 is the first fixture of the system 202 that engages in the cot fastener track 212, the middle fixture 205 is the second fixture of the system 2 that engages in the cot fastener track 212, and the rearward and secondary middle fixtures 206, 207, respectively, are the third (and last) fixtures of the system 202 that engage both at or approximately the same time in the cot fastener track 212. Likewise, the rearward fixture and secondary middle fixtures 206, 207, respectively, are the first fixtures of the system 202 to disengage from the cot fastener track 212, the middle fixture 205 is the second fixture of the system 2 to disengage from the cot fastener track 212, and the forward fixture 204 is the third (and last) fixture of the system 202 to disengage from the cot fastener track 212 when unloading the emergency cot 14 from the vehicle 8 in the unloading direction indicated by the arrow 25.

Figure 22:
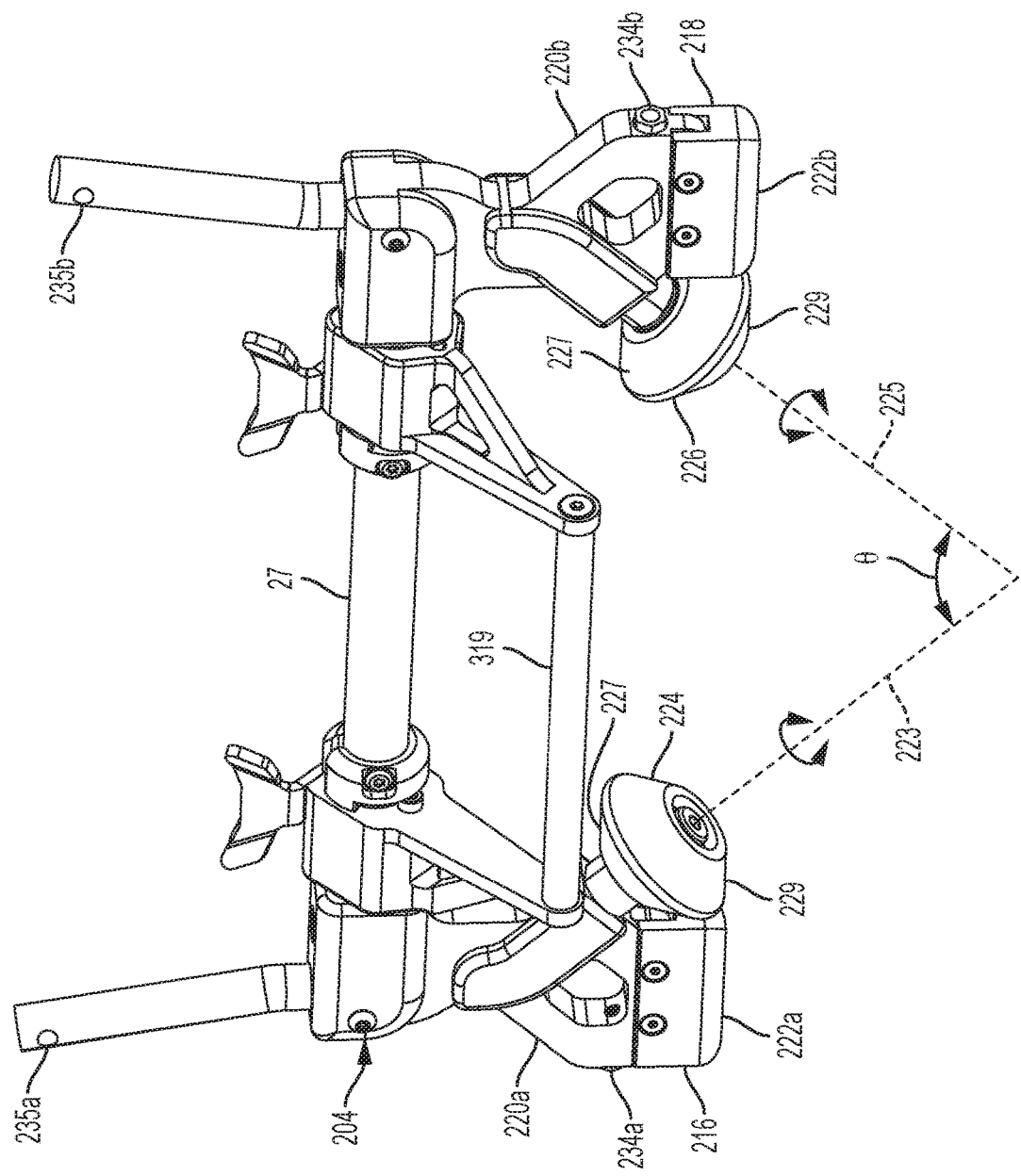
FIG. 22 depicts an isometric view of a forward fixture of the cot fixture assembly of FIG. 21 that is provided to an emergency cot, which is shown with parts removed for easy of illustration and discussion.

As shown by FIG. 22, the forward fixture 204 in this embodiment includes a pair of spanned apart (i.e., first and second) mounting brackets 216, 218. As depicted, mounting brackets 216 and 218 are identical to each other in design. Each mounting bracket 216 and 218 is comprised of upper and lower bracket portions 220a, 220b and 222a, 222b, respectively. As depicted best by FIG. 33A, forward load wheels 232a, 232b of the cot 14 are mounted at lower mounting points 234a and 234b, respectively, to the upper bracket portions 220a, 220b. The cot 14 is also mounted to the upper bracket portions 220a, 220b at upper mounting points 235a, 235b, which are located above vertically a distance from the lower mounting points 234a, 234b (FIG. 22). A pair of rollers or wheels 224, 226 is provided inwardly of the lower brackets 222a, 222b and mounted to the upper bracket portions 220a, 220b, respectively. Each of the wheels 224, 226 is mounted to a respective one of the upper bracket portions 220a, 220b at an angle, and orientated relative to each other such that each respective rotational axis 223, 225 of the wheels 224, 226 traverses each other at an angle θ. In some embodiments, angle θ may range from 30 to 60 degrees and in one specific embodiment angle θ is 45 degrees. It is to be appreciated that angle θ is selected in combination with the shape of the wheels 224, 226 such that an exterior top surface 227 and an exterior bottom surface 229 of the wheels 224, 226 engages and/or comes into contact with the cot fastener track 212.

Figure 23:
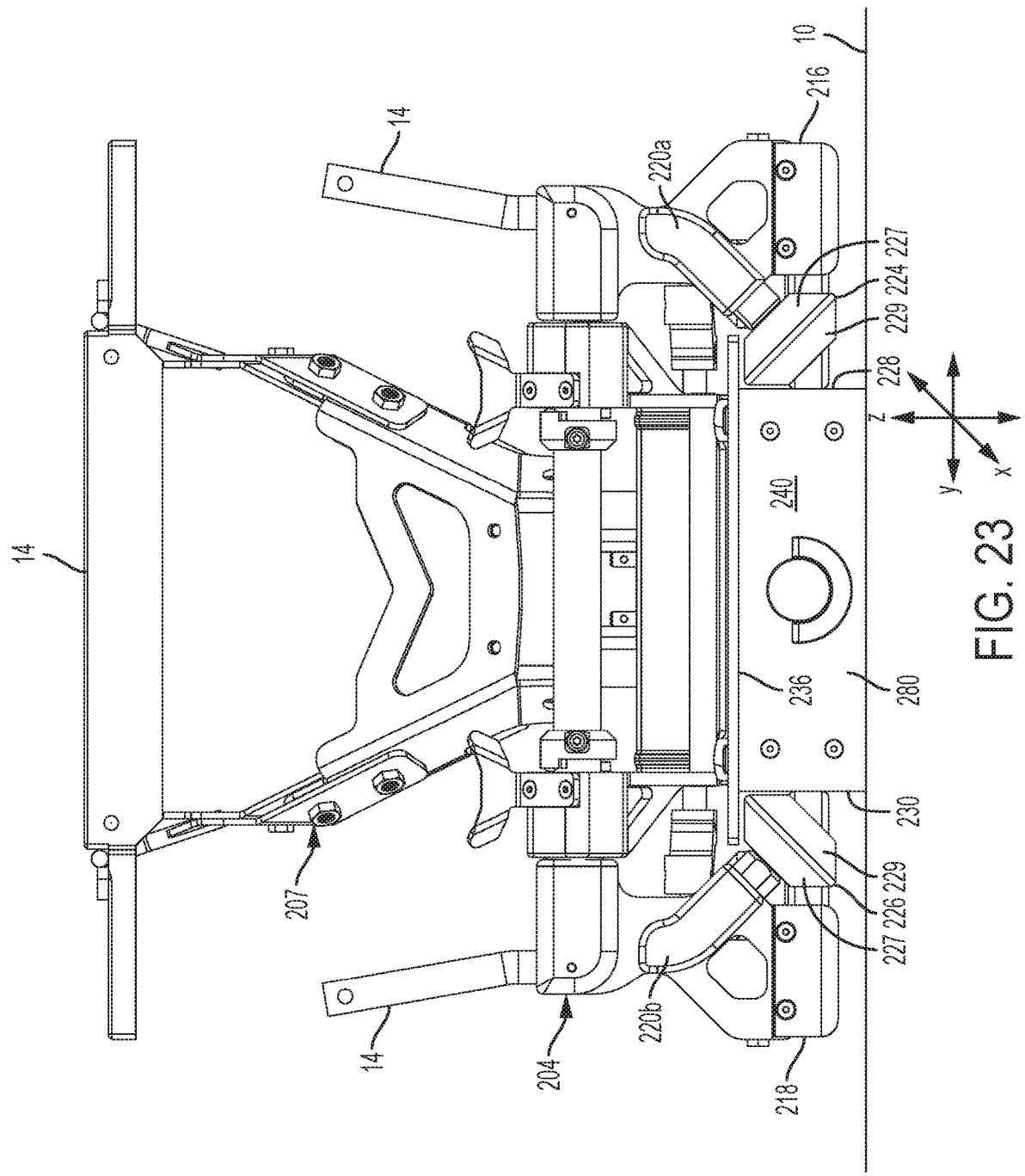
FIG. 23 depicts a front perspective view of a cot transport/emergency vehicle, partially broken away, provided with the cot fastening system of FIG. 21, and showing a close-up of a forward fixture and a secondary middle fixture of the cot fixture assembly that is provided to an emergency cot, which is shown with parts removed for easy of illustration and discussion, and which engage the fastener at forward and middle portions thereof according to an embodiment of the invention.

As depicted by FIG. 23, showing a front end 280 of the cot fastener track 212, the pairs of wheels 224, 226 are identical in size. The orientation of the wheels 224, 226 ensure that the cot 14 upon moving in the loading direction (FIG. 21) smoothly engages the cot fastener track 212 between the mounting brackets 216, 218, and that the wheels 224, 226 smoothly travels thereon along respective sidewalls 228, 230 of the cot fastener track 212. As shown, the exterior top surface 227 and the exterior bottom surface 229 of the wheels 224, 226 engages and/or comes into contact with an underside of a roof plate 236 and the sidewalls 228, 230 of fastener track 212, respectively, when moving the cot 14 in the loading and unloading directions (FIG. 21) along the cot fastener track 212.

It is to be appreciated that the roof plate 236 has a maximum width which is less than the greatest distance between the upper bracket portions 220a, 220b, but which is greater than the smallest distance between the wheels 224, 226. Additionally, the smallest distance between the wheels 224, 226 is greater than the largest width between the sidewalls 228, 230. In this manner, the wheels 224, 226 of the forward fixture 204 are retained between the roof plate 236 and the support surface (i.e., floor) 10 of the vehicle 8 in a first (vertical) direction Z, and by the sidewalls 228, 230 in a second (side-to-side) direction Y. A front plate 240 of the cot fastener track 212 is depicted as having the same width as the distance between sidewalls 228, 230 at this end, but in other embodiments may be provided with a width that is wider than the distance between the sidewalls 228, 230 as an end cap, such that the wheels 224, 226 of the forward fixture 204 are also retained by the front plate 240 in a third (forwardly only or loading) direction X.

Figure 24:
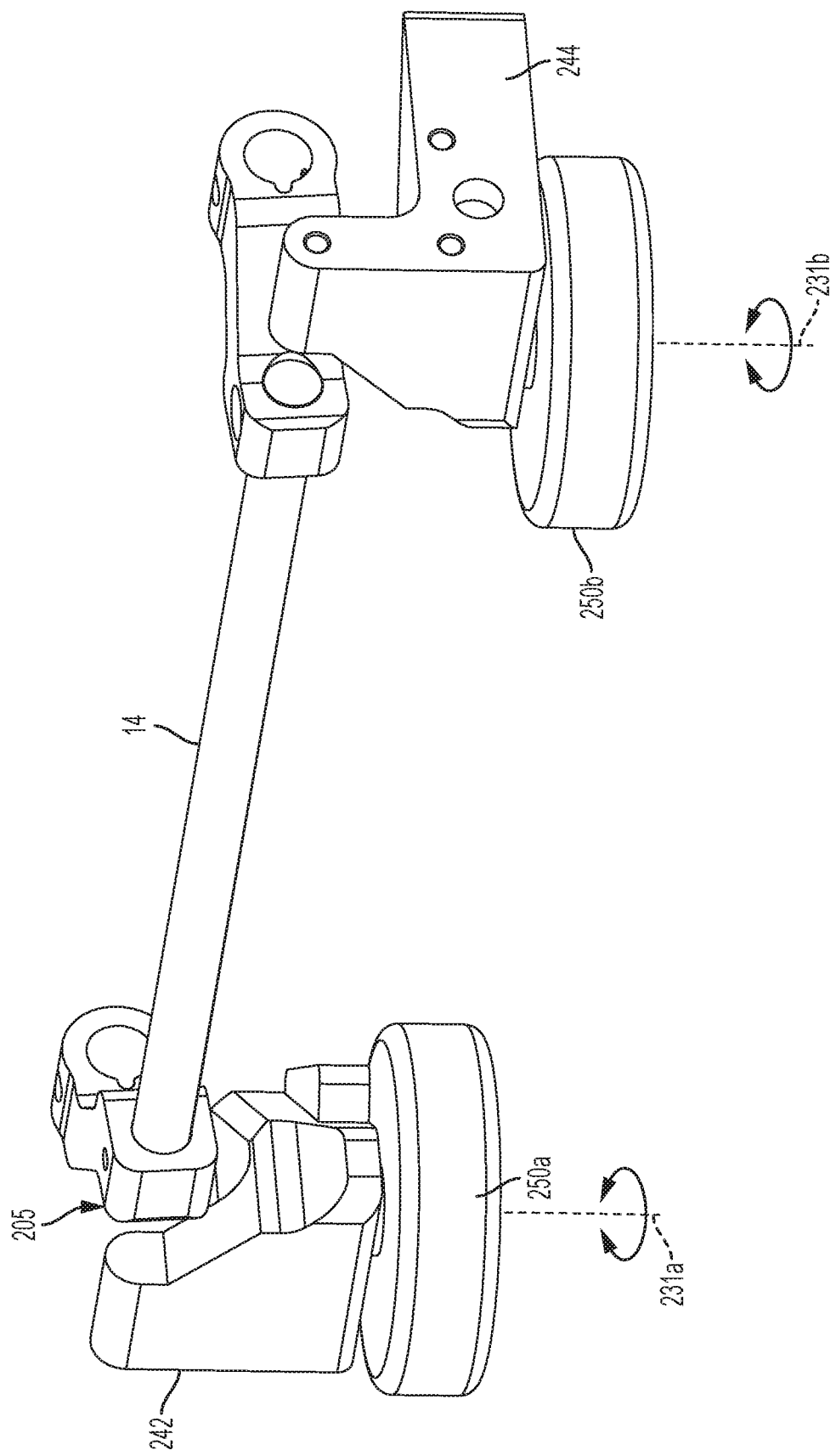
FIG. 24 depicts an isometric view of a middle fixture of the cot fixture assembly of FIG. 21 that is provided to an emergency cot, which is shown with parts removed for easy of illustration and discussion.

Turning now to FIG. 24, the middle fixture 205 includes a pair of spanned apart (i.e., third and fourth) mounting brackets 242, 244. As depicted, mounting brackets 242, 244 are identical to each other in design. Each mounting bracket 242, 244 has a respective roller or wheel 250a, 250b. As depicted the each wheel 250a, 250b is identical in size and they are orientated such that their respective axis of rotation are generally parallel relative to each other. The orientation and location of each wheel 250a, 250b ensure that the cot 14 upon moving in the loading and unloading directions (FIG. 21) smoothly engages the cot fastener track 212 between the mounting brackets 242, 244, and that each wheel 250 smoothly travels thereon along respective sidewalls 228, 230 of the cot fastener track 212.

Figure 21:
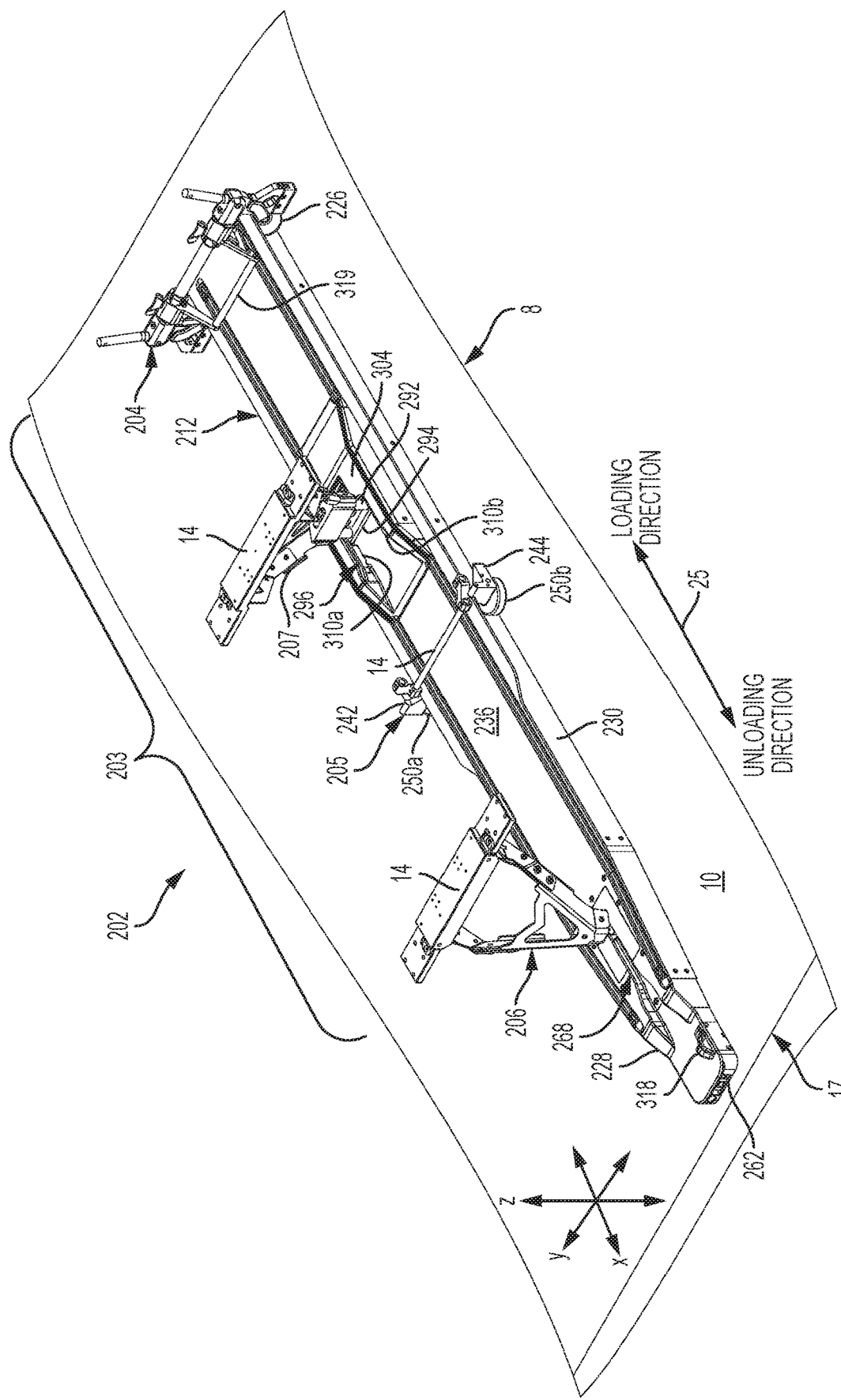
FIG. 21 depicts a rear and side perspective of a cot transport/emergency vehicle, partially broken away, provided with a cot fastening system according to another embodiment of the invention which comprises a fastener device which is used to releasably secure an emergency cot, shown with parts removed for easy of illustration and discussion, via a cot fixture assembly provided to the cot and which is securable with system.
Figure 25:
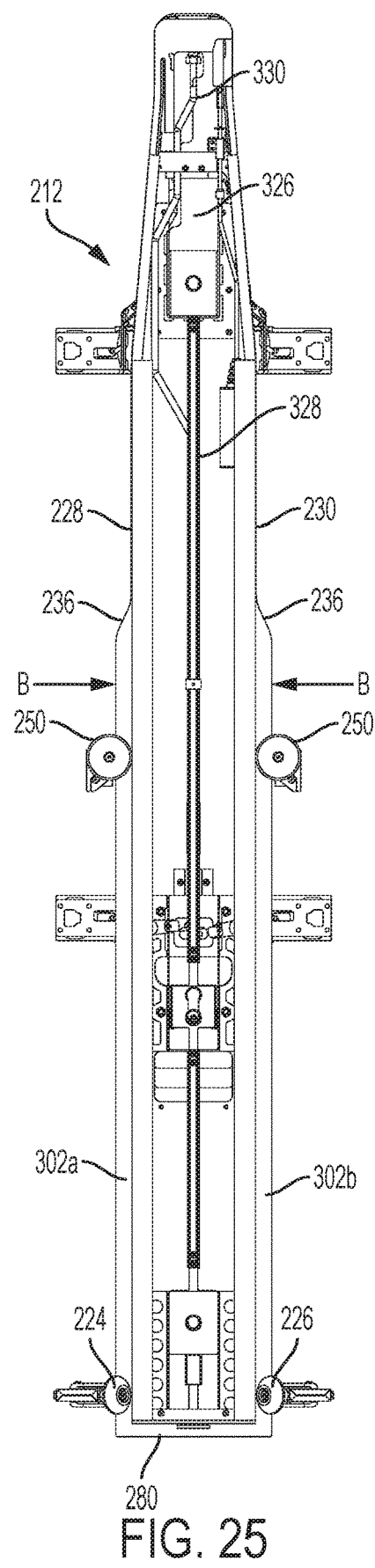
FIG. 25 depicts a bottom perspective view of the cot fastening system of FIG. 21, and showing a forward fixture and a middle fixture of the cot fixture assembly that is provided to an emergency cot, which is shown with parts removed for easy of illustration and discussion, engaging the fastener at forward and middle portions thereof according to an embodiment of the invention.

With reference to FIGS. 21, 24 and 25, the axis of rotation 231a, 231b of each respective wheel 250a, 250b of the middle fixture 205 is orientated substantially parallel to the sidewalls 228, 230 of the cot fastener track 212, such that the wheels 250a, 250b roll perpendicular to the sidewalls 228, 230 of the cot fastener track 212. It is to be appreciated that the roof plate 236 of the cot fastener track 212 has a maximum width which is less than the greatest distance between the mounting brackets 242, 244, but which is greater than the smallest distance between the wheels 250a, 250b when the cot is fully loaded and locked in the cot fastener track 212 as best depicted by FIG. 25. Additionally, the smallest distance between the wheels 250a, 250b is greater than the largest width between the sidewalls 228, 230. In this manner, the wheels 250a, 250b of the middle fixture 205 are retained between the roof plate 236 and the support surface (i.e., floor) 10 of the vehicle 8 in the first (vertical) direction Z, and by the sidewalls 228, 230 in the second (side-to-side) direction Y.

Figure 26:
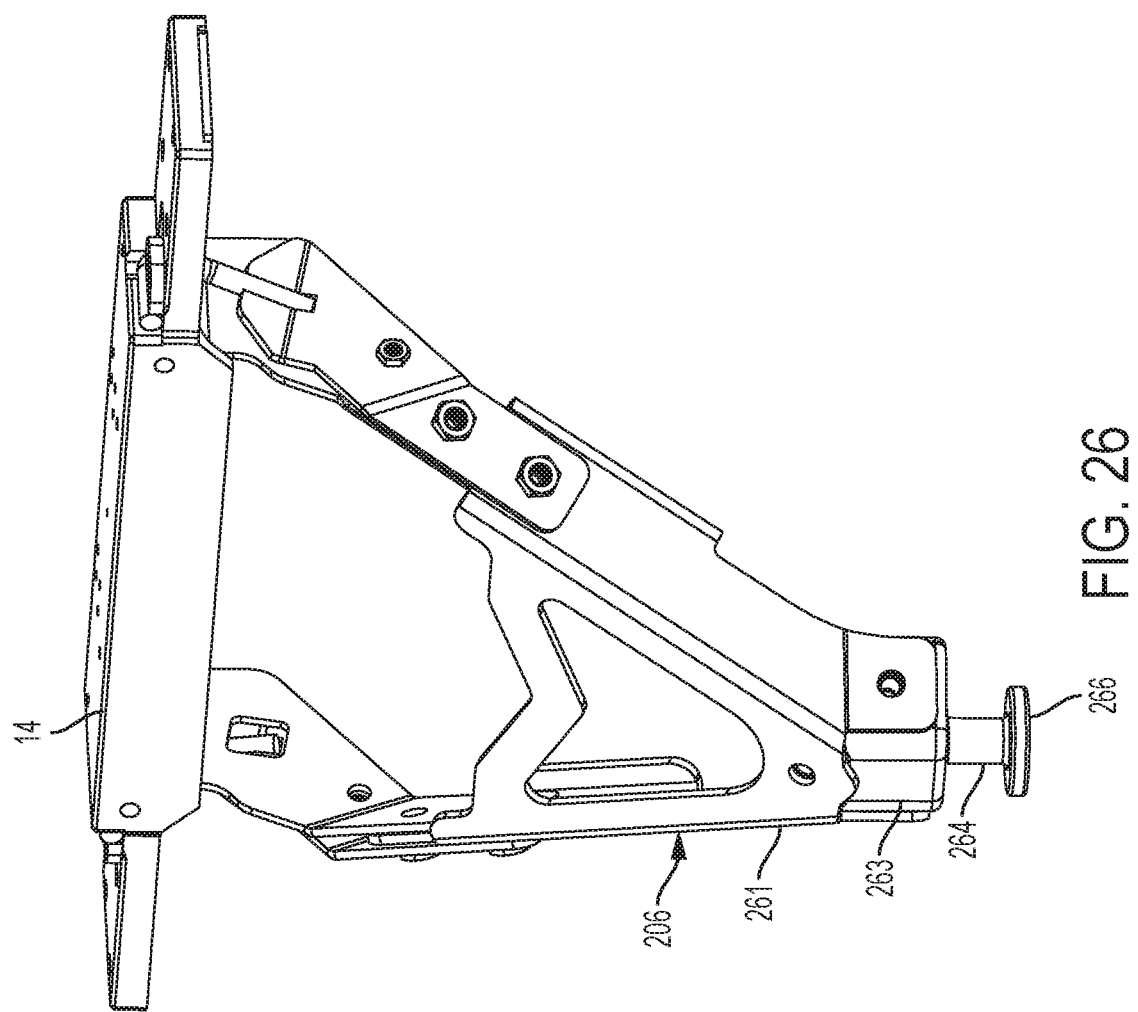
FIG. 26 depicts an isometric view of a rearward fixture of the cot fixture assembly of FIG. 21 that is provided to an emergency cot, which is shown with parts removed for easy of illustration and discussion.
Figure 27:
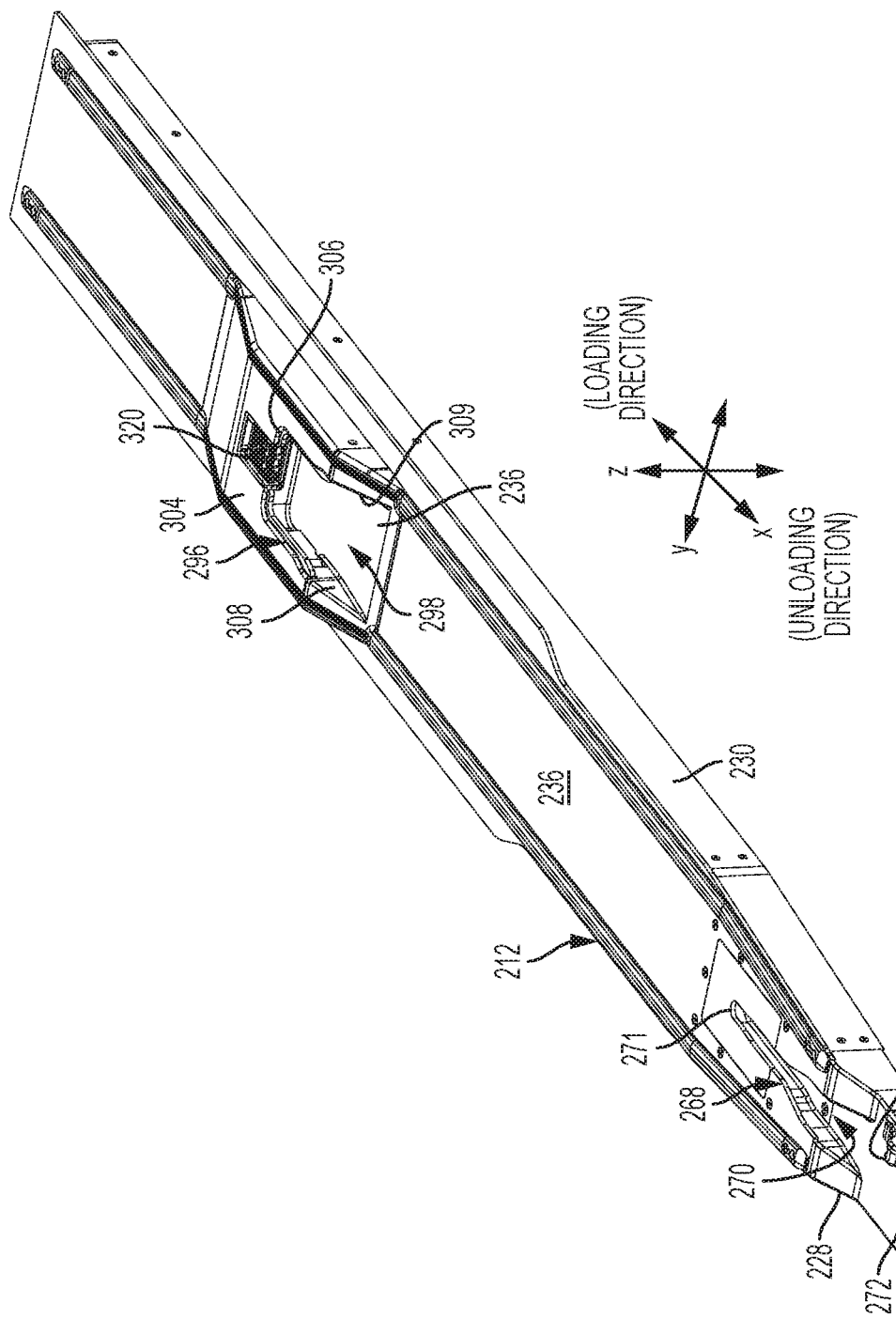
FIG. 27 depicts an elevational rear and side perspective view of the fastener according to the embodiment of the cot fastening system of FIG. 21.
Figure 28:
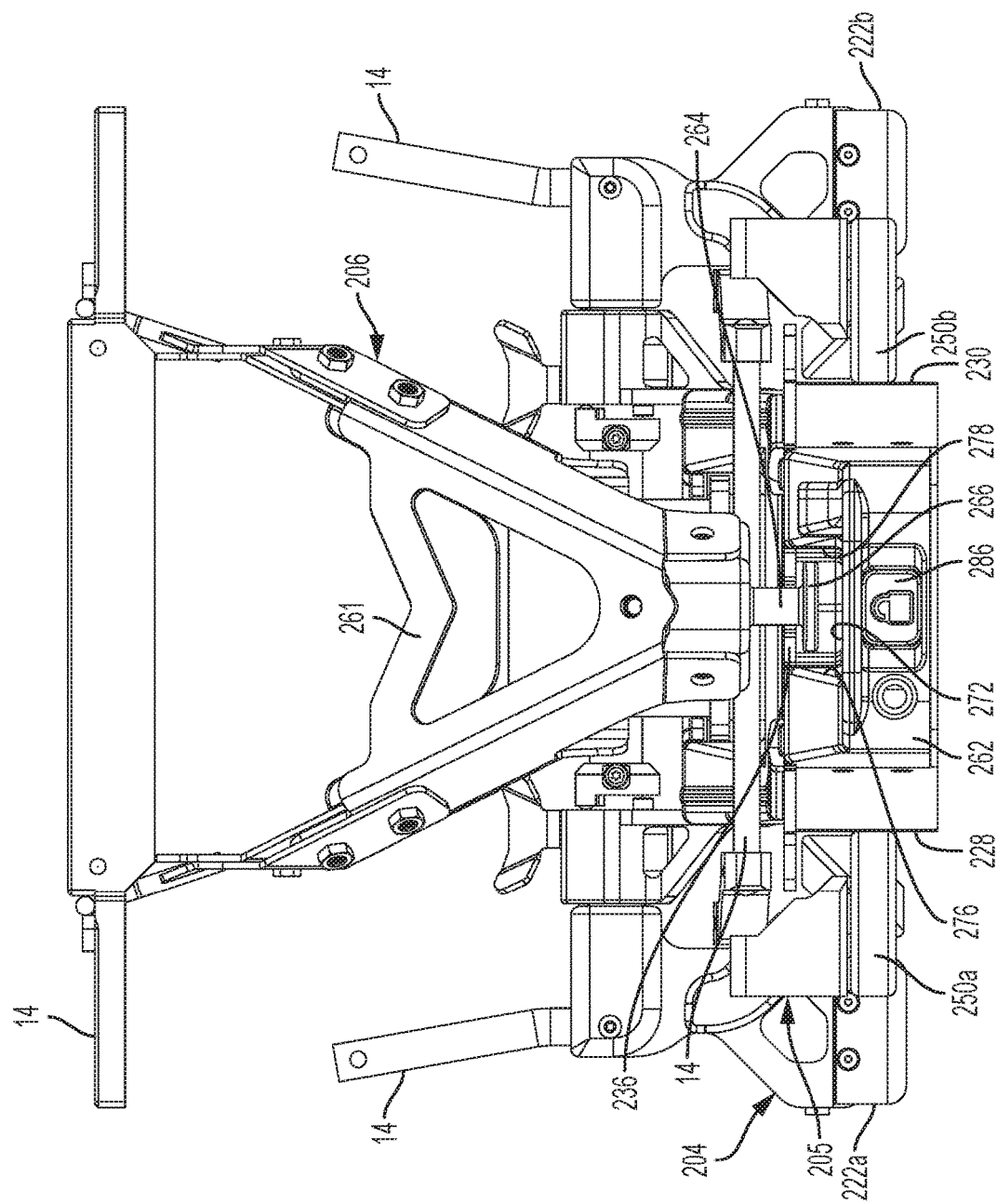
FIG. 28 depicts a rear perspective view of a cot transport/emergency vehicle, partially broken away, provided with the cot fastening system of FIG. 21, and showing a close-up of a rearward fixture, a middle fixture and a forward fixture of the cot fixture assembly that is provided to an emergency cot, which is shown with parts removed for easy of illustration and discussion, and which engage the fastener at rearward, forward and middle portions thereof according to an embodiment of the invention.

Turning now to FIG. 26, the rearward fixture 206 includes a V-shaped bracket 261 that mounts to the cot 14 and which at a bottom portion 263 thereof includes a post 264 that supports a generally circular or disc-shaped foot 266. Although foot 266 is depicted as being circular or disc-shaped, other geometric shapes such as oblong, oval, elliptical, square, rectangular, etc. may likewise be conveniently used. As best shown by FIG. 27, provided adjacent and above a back end wall 262 of the cot fastener track 212 is a rearward central channel 268 that is defined in the roof plate 236. As depicted, the rearward central channel 268 extends a distance longitudinally relative to the longest length of the cot fastener track 212 (i.e., the length extending generally parallel to the loading and unloading directions), and is centrally located between the sidewalls 228, 230. When loading the cot 14 in the loading direction, the rearward fixture 206 is shaped and sized such that the foot 266 passes over the back end wall 262 and enters into the rearward central channel 268 through a defined rearward channel opening 270 that is provided adjacent the back end wall 262. Extending from the rearward channel opening 270, the rearward central channel 268 in the roof plate 236 tapers to a generally C-shaped end 271. It is to be appreciated that the smallest side-to-side width of the rearward central channel 268 is larger than the diameter of the post 264 (FIG. 26), but at least adjacent the end 271 is smaller than the largest side-to-side width or diameter of the foot 266. In this manner and as depicted by FIG. 28, with the cot 14 loaded and secured to the cot fastener track 212, the foot 266 (FIG. 26) is retained in the rearward central channel 268 in the first (vertical) direction Z by a floor member 272 (best shown by FIG. 27) of the cot fastener track 212 and the roof plate 236, by interior sides portions 276, 278 of the rearward central channel 268 in the second (side-to-side) direction Y, and by the C-shape end 271 in the third (forwardly only or loading) direction X, which all together defines the rearward central channel 268.

In a similar manner to fastener track 12, in some embodiments, the rearward blocking or catch member 87 (FIG. 20) can be provided to the cot fastener track 212, which can be selectively activated mechanically, electrically or combinations thereof, to block the foot 266 from being removed in the unloading direction, and to unblock the foot 266 when removal of the cot 14 from the cot fastener track 212 is intended. For example, the wireless remote control 63 (FIG. 18) and/or a pushbutton 286 (FIG. 27) can be used to control the locking and unlocking of the foot 266 from the rearward blocking or catch member 87 (FIG. 20). In still some other embodiments, the manner in which the cot fastener track 212 engages with and releases the foot 266 of the rearward fixture 206 can be similar to the manner described previously above in the other embodiments, as well as by U.S. Pat. Nos. 5,092,722 and 5,913,559, which are incorporated herein fully by reference, and for purposes of brevity, no further discussion thereon is provided.

Figure 29:
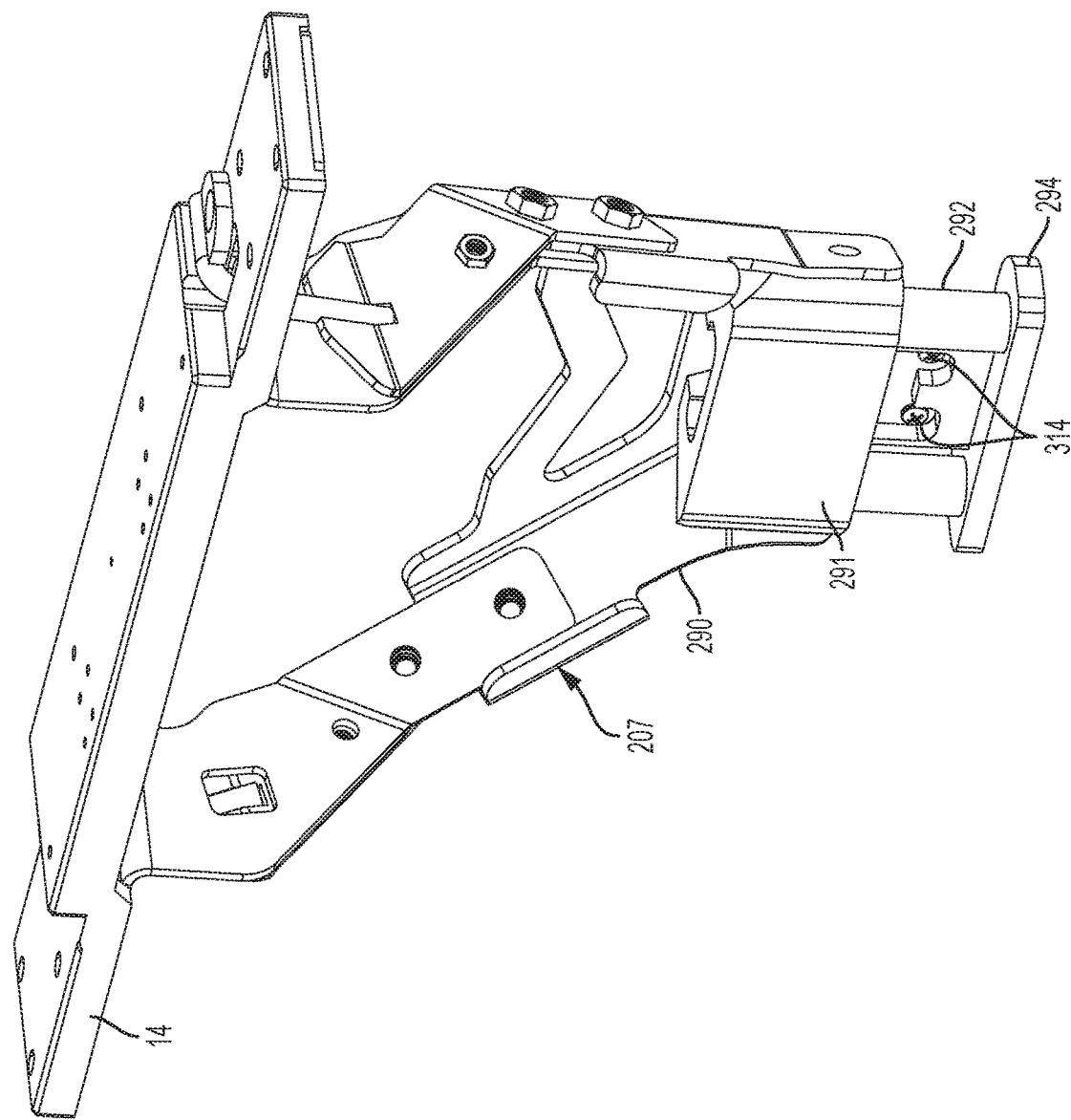
FIG. 29 depicts an isometric view of a secondary middle fixture of the cot fixture assembly of FIG. 21 that is provided to an emergency cot, which is shown with parts removed for easy of illustration and discussion.

Turning now to FIG. 29, the secondary middle fixture 207 includes a V-shaped bracket 290 that mounts to the cot 14 and which at a bottom portion 291 thereof includes a post 292 that supports a generally rectangular or oblong foot 294. Although foot 294 is depicted as being rectangular or oblong, other geometric shapes such as oval, elliptical, square, circular, etc. may likewise be conveniently used. As best shown by FIG. 27, provided forward and above the rearward central channel 268 on the roof plate 236 is a forward central channel 296. As depicted, the forward central channel 296 extends a distance longitudinally relative to the longest length of the cot fastener track 212 (i.e., the length extending generally parallel to the loading and unloading directions), and is centrally located between the sidewalls 228, 230. When loading the cot 14 in the loading direction, the secondary middle fixture 207 is shaped and sized such that the foot 294 passes over both the back end wall 262 and the rearward central channel 268, and enters into the forward central channel 296 through a defined forward channel opening 298.

Figure 30:
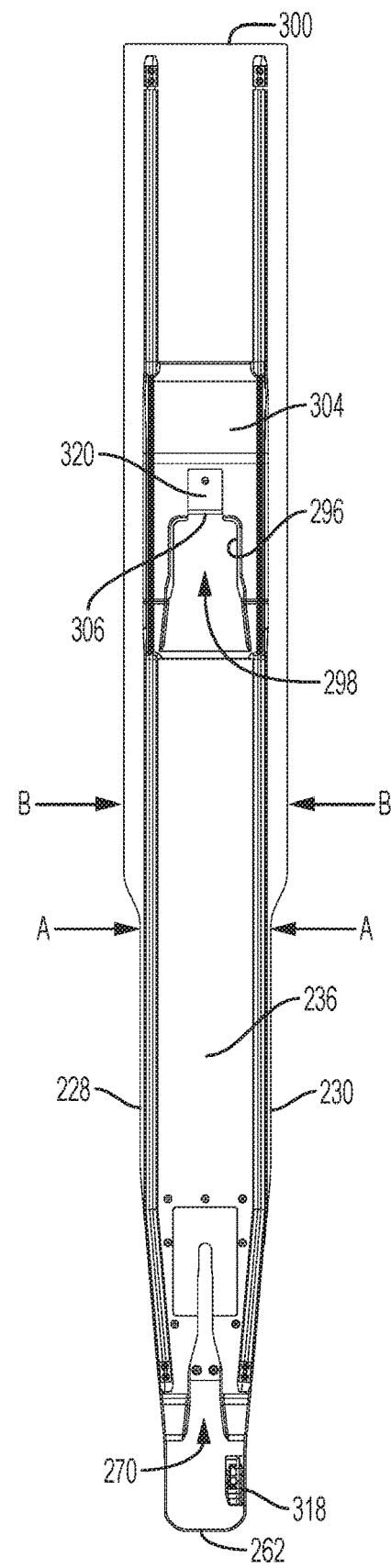
FIG. 30 depicts a top view of the fastener according to the embodiment of the cot fastening system of FIG. 21.
Figure 31:
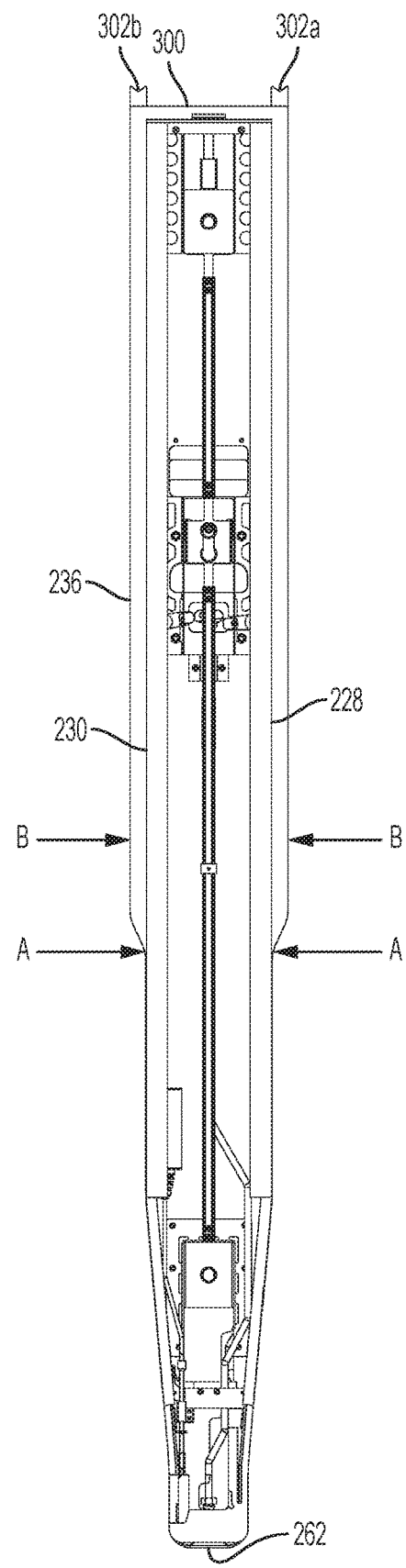
FIG. 31 depicts a bottom view of the fastener according to the embodiment of the cot fastening system of FIG. 21.

As best depicted by FIGS. 30 and 31, the roof plate 236 has a generally trapezoidal shape, which is wider at a front end 300 than at the back end wall 262. From the rearward channel opening 270 (FIG. 30) to depicted location A, which is located rearward of depicted mid-location B that represents the middle (half length) of the cot fastener track 212, the roof plate 236 basically has the same width as the width defined between sidewalls 228, 230. Forward of location A and going towards the front end 300, a portion of the roof plate 236 widens to provide respective overhang portions 302a, 302b to sidewalls 228, 230 (i.e., the width of the roof plate 236 is wider than the width between sidewalls 228, 230 forward of location A) as best shown by FIG. 31. As depicted by FIG. 25, the overhang portions 302a, 302b of the roof plate 236 are sized and shaped to retain the wheels 224, 226 and 250 in the vertical direction forward of the mid-location B when the cot is secured to the cot fastener track 212.

As depicted by FIG. 31, the forward channel opening 298 is located forward of mid-location B, in which a portion of the forward central channel 296 defined by a top plate 304 of the cot fastener track 212 is generally V- or U-shaped. It is to be appreciated that the smallest side-to-side width of the forward central channel 296 defined by the top plate 304 is larger than the largest width of the post 292 (FIG. 30). Additionally, at least adjacent a side end 306 of the forward central channel 296, the smallest side-to-side width of the forward central channel 296 is smaller than the largest side-to-side width or diameter of the foot 294. In this manner and as best depicted by FIGS. 21 and 27, with the cot 14 loaded and secured to the cot fastener track 212, the foot 294 is retained in the forward central channel 296 in the first (vertical) direction Z by being located between the top plate 304 of the cot fastener track 212 and the roof plate 236, by interior sidewall portions 308, 309 (FIG. 27) of the forward central channel 296 in the second (side-to-side) direction Y, and by the side end 306 (FIG. 27) in the third (forwardly only or loading) direction X, which all together defines the forward central channel 296.

To releasably retain the foot 294 in the forward central channel 296 and prevent movement in the unloading (rearward) direction, in one embodiment, one or more blocking or more catch members 310a, 310b (FIGS. 21 and 32) can be provided. As best depicted by FIG. 32, the blocking or catch members 310a, 310b are movable between a retracted positioned (indicated by the dashed lines) which locates the catch members 310a, 310b within the interior sidewall portions 308, 309, respectively, such that their facing surfaces 312a, 312b are flush with the sidewall portions 308, 309, respectively, and an extended position which locates the facing surfaces 312a, 312b closer together such that they are no longer flush with the sidewall portions 308, 309 as shown. The blocking or catch members 310a, 310b can be selectively activated mechanically, electrically or combinations thereof to move from the retracted position to the extended position to block the foot 294 from being removed in the unloading direction as depicted by FIG. 21, and vice versa to unblock the foot 294 when removal of the cot 14 from the cot fastener track 212 is intended. For example, the wireless remote control 63 (FIG. 18) and/or the pushbutton 286 (FIG. 32) can be used to control the locking and unlocking of the foot 294 of the secondary middle fixture 207 within forward central channel 296, via movement of the blocking or catch members 310a, 310b, simultaneously in one embodiment with the locking and unlocking of the 266 of the rearward fixture 206 within the rearward central channel 268 via the movement of the rearward blocking or catch member 87 (FIG. 20). In still other embodiments, the manner in which the cot fastener track 212 releasably secures the foot 294 of the secondary middle fixture 207 within the secondary central channel 296 can be similar to the manner in which the cot fastener track 212 releasably secures the foot 266 of the rearward fixture 206 within the rearward central channel 268 as described previously above in the other embodiments and vice versa, and as well as any of the manners described by U.S. Pat. Nos. 5,092,722 and 5,913,559, which are incorporated herein fully by reference, and for purposes of brevity, no further discussion thereon is provided.

In some embodiments, the activation of one or more of the blocking or catch members 87, 310a, 310b can be automatic for blocking (via a contact switch, proximity sensor, hall effect sensor, magnetic switching, beam breaking, circuit forming, etc.) in the loading direction. In other embodiments, the activation of one or more of the blocking or catch members 87, 310a, 310b for unblocking in the unloading direction, may require activation of the same or different remote devices and/or pushbuttons to release the foots 266, 294 from their respective central channels 268, 296. In still other embodiments, the sequence of movement of the blocking or catch members 87, 310a, 310b to block (lock) and/or unblock (unlock) the foots 266, 294 from their respective central channels 268, 296 may be via a sequence (i.e., one after the other).

Referring back to FIGS. 29 and 32, the post 292 of the secondary middle fixture 207 can provide one or more charging points 314 that electrically connect with one or more charging connectors 316 provided adjacent the forward central channel 296. The charging points 314 and/or the charging connectors 316 may be spring biased towards each other to help maintain the electrical connect there between, and provide inductive and/or conductive charging to the cot 14. When the cot 14 is fully loaded into the vehicle 8, and fixed and secured releasably therein by the cot fastener track 212, the charging connectors 316 electrically connect the charging points 314 to an integrated charging system 320 of fastener track 212 which is electrically powered by the electrical system of the vehicle 8. In this manner, this electrical connection provided between the charging connectors 316 and the charging points 314 allows the cot 14, if battery operated, to be recharged whenever it is locked into the cot fastener track 212.

Referring back to FIGS. 22 and 27, during the unloading sequence, in some embodiments, a bail 319 (FIG. 22) of the cot 14 engages with a provided safety hook 318 of the cot fastener track to prevent the 14 cot from being unloaded until the bail 319 is intentionally released from the safety hook 318. The feature facilitates the safe loading and unloading of the cot 14 as the engagement of the bail with the safety hook prevents the cot from being rolled off the support surface 10 of the vehicle 8 until the legs of the cot have been positioned to support the weight of the cot. The safety hook 318 in one embodiment can be provided fixed to the cot fastener track 212 such that the bail 319 has to be lifted to clear the non-moveable safety hook 318, thereby allowing the cot 14 to be unloaded. In another embodiment, the safety hook 318 can be moveable between extended and retracted positions, such that it can be retracted into the cot fastener track 212, thereby clearing the engagement with the bail 319 and allowing the cot 14 to be unloaded. For example, the safety hook 318 can be spring biased and operated in the same manner as safety hook 91 (FIG. 18) described previously above or can be connected to an actuator 322 (indicated by dashed lines in FIG. 32) of the cot fastener track 212, thereby allowing a user to lower the safety hook 318 remotely, e.g., by the wireless remote control 63 (FIG. 18) and/or pushbutton 286.

A sensor 324 may be provided to the cot fastener track 212 for receiving wireless communications, such as the commands to lock and/or unlock the foots 266, 294 from their respective central channels 268, 296, and/or retract (lower) the safety hook 318 sent from the wireless remote control 63. For example, and with reference made also to FIG. 25, upon receipt of such a wireless communication signal by the sensor 324, an electronically controlled actuator 326 may be activated to move linkage 328 that moves the blocking or catch members 87, 310a, 310b in the commanded manner e.g., blocking (securing the cot in the fastener), unblocking (releasing the cot from the fastener). In other embodiments, additional linkage 330 connected between the pushbutton 286 and the linkage 328 may also be provided in order to manually move the linkage 328 via a press of pushbutton 286 e.g., in cases of power outages.

It is to be appreciated that the cot fastener track 212 secures the cot 14 from six points: two points at the front (patient's head end) adjacent the front plate 240 via the engagement of forward fixture 204 with the sidewalls 228, 230 and the overhang portions 302a, 302b, two other points at about the middle of the cot via the engagement of the middle fixture 205 also with the sidewalls 228, 230 and the overhang portions 302a, 302b, another point between the middle and head end of the cot via the engagement of the secondary middle fixture 207 with the forward central channel 296 and the remaining point at the back (patient's foot end) adjacent the back end 262 via the engagement of the rearward fixture 206 with the rearward central channel 268. In some embodiments, only one of the center channels 268, 296 has an active locking mechanism, i.e., the blocking or catch member 87, 310a, 310b, and is the only point that secures the cot 14 from moving rearwards (towards the patients foot end) in the unloading direction. In other embodiments, the cot 14 may be secured at the middle and rear points via a respective active locking mechanism (i.e., blocking or catch member 87, 310a, 310b) in the unloading direction.

Figure 33A:
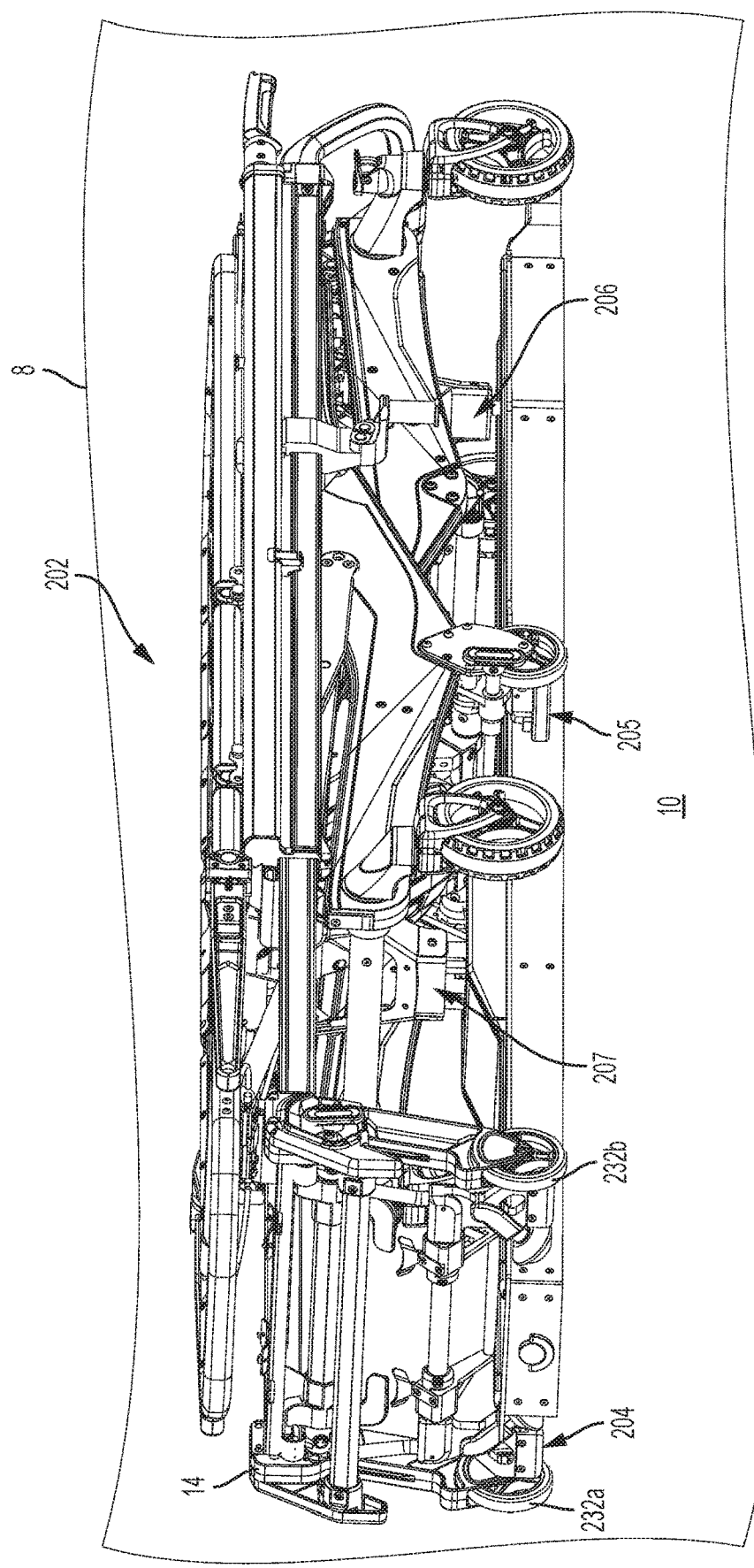
FIG. 33A depict an elevational front and side perspective view of a cot transport/emergency vehicle, partially broken away, provided with the cot fastening system of FIG. 21 and showing an emergency cot secured thereto within the vehicle.
Figure 33B:
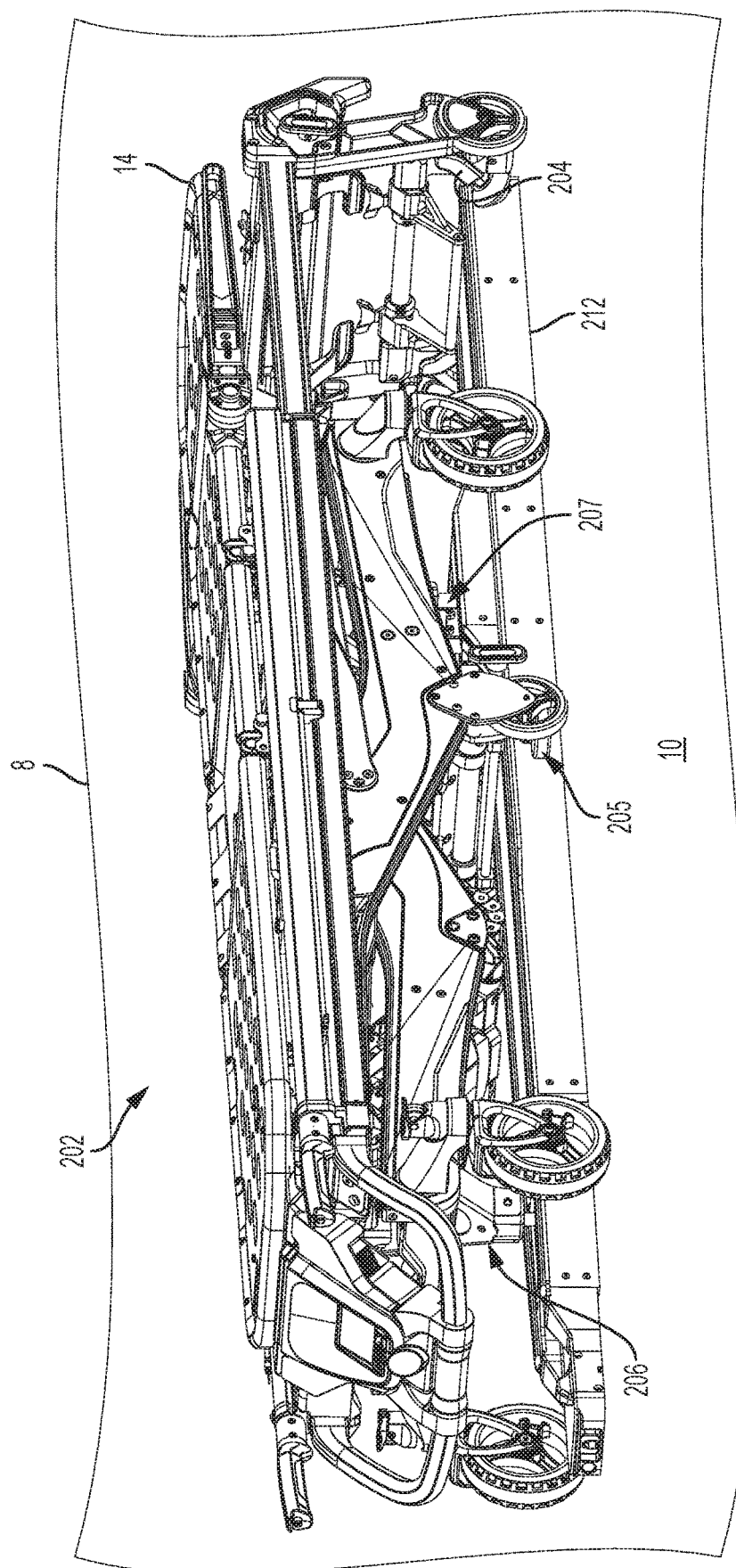
FIG. 33B depicts an elevational rear and side perspective view of a cot transport/emergency vehicle, partially broken away, provided with the cot fastening system of FIG. 21 and showing an emergency cot secured thereto within the vehicle.

Referring now to FIGS. 33A and 33B, elevated rear and side perspective views of the vehicle 8, partially broken away, are shown provided with the cot fastening system 202 according to an embodiment of the invention, and in which the cot fastener track 212 of the system 202 is shown releasably securing an emergency cot 14, via the cot fixture assembly 3 (FIG. 21) of the system 202 that has been provided to the cot 14.

Some of the other noted advantageous of the various embodiments of the system 202 and not limited thereto, are that the depicted embodiments of the cot fastener track 212 have a clean profile which is easy to clean and safe for operators to walk over while the cot 14 is out of the vehicle 8. Angled surfaces as depicted by the various views of figures, as well as the relatively reduced size in width of the roof plate 236 toward the vehicle rear entrance (depicted by loading edge 17 in FIG. 21), i.e., adjacent the back end 262 as compared to its size in width forward of position A (FIG. 30), allow an operator to load the cot 14 even if it is misaligned to the cot fastener track 212.

Figure 34:
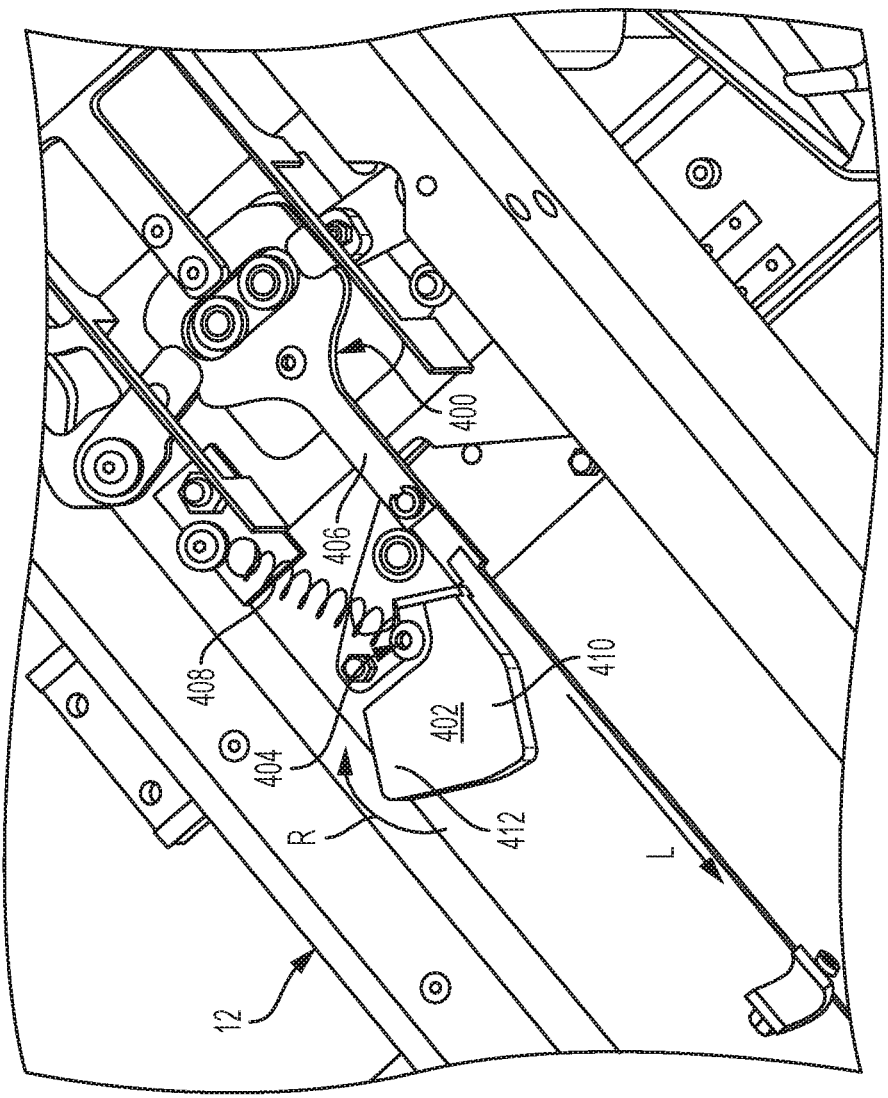
FIG. 34 depicted a mechanism that keeps a lock mechanism of a cot fastener track from unlocking during an acceleration from a forward collision.

With reference to FIG. 34 depicted is a safety mechanism 398 that keeps a lock mechanism 400 of a cot fastener track 12 from unlocking during an acceleration caused from a forward collision. In a forward crash, a counterweight 402 of the safety mechanism 398 creates a rotational force, indicated by arrow R, about a pivot 404 that is higher than what a linkage bar 406 of the lock mechanism 400 can create during the resulting acceleration of the cot fastener 12. In this manner, during a forward crash the linkage bar 406 stays in the locked position. The direction of the locked position is indicated by arrow L. An extension spring 408 is attached to a beak-shaped portion 410 of the counterweight 402 and is located on the other side of the pivot 404 from a remaining, more massive/heavier portion 412 of the counterweight 402. As the acceleration stops from the frontal crash (or from hard breaking of the transport vehicle), the spring 408 returns the counterweight 402 of the safety mechanism 398 back to the pre-crash position, such that the lock mechanism 400 may be moved in a direction opposite of the locked direction L, i.e., to an unlocked position.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The invention claimed is:

1. A cot fastening system which fixes and holds within a transport vehicle an emergency cot having mounted thereon wheels, a first fixture and a second fixture, said cot fastening system comprising:
   a cot fastener track having a longitudinal length with opposite first and second ends, a pair of open side rails longitudinally extending between the first and second ends, and a channel centrally located between the open side rails, said open side rails being configured to align therewith, accommodate therein and guide together the first fixture of the cot along the longitudinal length of the cot fastener track towards the first end as the cot is rolled by the wheels within the vehicle and to retain the first fixture adjacent the first end at least vertically and laterally therein, and said channel being configured to accommodate therein and retain the second fixture adjacent the second end at least vertically and laterally therein; and
   a securing mechanism operably selectable between secure and unsecure conditions, in which said secure condition prevents both removal of the first fixture from the open side rails and removal of the second fixtures from the channel.

2. The cot fastening system according to claim 1, wherein the cot fastener track has opposite longitudinal sides and a roof plate, wherein the open side rails are defined by the roof plate having a portion which overhangs the opposite longitudinal sides.

3. The cot fastening system according to claim 1, wherein the cot fastener track has opposite longitudinal sides, wherein the open side rails are c-shaped rails that are provided to the longitudinal sides.

4. The cot fastening system according to claim 1, wherein the first end has a first width and the second end has a second width that is smaller than the first width.

5. The cot fastening system according to claim 1, wherein the cot fastener track has a roof plate, wherein the roof plate adjacent the first end has a first width and the roof plate adjacent the second end has a second width that is smaller than the first width, and the roof plate tapers from the first width to the second width.

6. The cot fastening system according to claim 1, wherein the cot fastener track has a roof plate, wherein the roof plate adjacent the first end has a first width and the roof plate adjacent the second end has a second width that is smaller than the first width, wherein the roof plate tapers from the first width to the second width, and wherein the roof plate over a majority of the longitudinal length of the cot fastener track has the first width.

7. The cot fastening system according to claim 1, wherein at least one of the open side rails and the channel is configured to prevent movement of the first fixture beyond the first end of the cot fastener track.

8. The cot fastening system according to claim 1, wherein the securing mechanism is operable to be placed in the unsecure condition via a wireless remote control.

9. The cot fastening system according to claim 1, wherein the channel is a first channel centrally located between the open side rails, and said cot fastener track comprises a second channel centrally located between the open side rails and configured to accommodate therein and retain a third fixture of the cot at least vertically and laterally therein, said second channel being located closer than the first channel to the first end.

10. The cot fastening system according to claim 1, wherein the securing mechanism is located in the channel.

11. The cot fastening system according to claim 1, wherein the securing mechanism is located in at least one of the open side rails.

12. The cot fastening system according to claim 9, wherein the securing mechanism is located in the second channel.

13. The cot fastening system according to claim 1, wherein the cot fastener track is configured to provide power to the cot when secured thereto.

14. The cot fastening system according to claim 1, wherein the cot fastener track is configured to provide data communications to the cot when secured thereto.

15. A method of fixing and holding within a transport vehicle an emergency cot having wheels mounted thereon, a first fixture and a second fixture, said method comprises:
   rolling the cot by the wheels within the transport vehicle having a cot fastener track according to any one of the proceeding claims, wherein the first fixture is aligned therewith, accommodated therein and guided by the open side rails along the longitudinal length of the cot fastener track towards the first end and then retained adjacent the first end at least vertically and laterally therein, wherein the second fixture is accommodated and retained adjacent the second end at least vertically and laterally therein by the channel, and wherein the securing mechanism automatically in said secure condition prevents both removal of the first fixture from the open side rails and removal of the second fixtures from the channel.

* * * * *